United States Patent [19]

Blackstone, Jr. et al.

[11] 4,106,416

[45] Aug. 15, 1978

[54] CONTROL APPARATUS FOR TEXTILE DYEING AND TUFTING MACHINERY

[75] Inventors: James Otto Blackstone, Jr., Lanett, Ala.; Fred Pickett Strother, West Point, Ga.

[73] Assignee: WestPoint Pepperell, Inc., West Point, Ga.

[21] Appl. No.: 746,948

[22] Filed: Dec. 2, 1976

[51] Int. Cl.² ............................................. D05C 15/34
[52] U.S. Cl. ................................................ 112/79 A
[58] Field of Search ................. 112/79 A, 79 R, 79 S, 112/79 FF, 78, 121.11, 121.12, 121.15; 139/319; 250/226; 340/172.5; 68/205 R

[56] References Cited

U.S. PATENT DOCUMENTS

| | | | |
|---|---|---|---|
| 2,804,764 | 9/1957 | Runton | 68/13 |
| 3,074,632 | 1/1963 | Braun et al. | 112/121.11 |
| 3,416,056 | 12/1968 | Motooka et al. | 112/121.12 X |
| 3,722,434 | 3/1973 | Strother et al. | 112/79 A |
| 3,863,310 | 2/1975 | Ochsner | 112/79 A X |
| 3,895,355 | 7/1975 | Shorrock | 112/79 A |
| 4,015,550 | 4/1977 | Bartenfeld et al. | 112/79 A |
| 4,033,154 | 7/1977 | Johnson | 68/205 R |

FOREIGN PATENT DOCUMENTS

| | | | |
|---|---|---|---|
| 695,407 | 10/1964 | Canada | 112/79 A |
| 1,040,619 | 9/1966 | United Kingdom | 112/79 R |
| 1,178,534 | 1/1970 | United Kingdom | 112/79 A |

Primary Examiner—H. Hampton Hunter
Attorney, Agent, or Firm—Davis, Hoxie, Faithfull & Hapgood

[57] ABSTRACT

Apparatus for developing multi-colored complex patterns in textile carpets formed by a yarn tufting operation, employing a scanner to scan and record color data from replicas or artists' renditions of the patterns to be tufted, a programmable read only memory to store the color data descriptive of the scanned patterns after electronic digitizing of the data, and a microprocessor and logic circuits to select a desired pattern from the memory and provide the color data for the selected pattern to individual yarn control assemblies at spaced dyeing stations of different colors. Individual yarn ends passing through the spaced dye stations are selectively dyed along their length at predetermined positions according to the color data provided to the yarn control assemblies at the spaced dye stations, the yarn ends then being delivered to a tufting machine to produce the selected multi-colored complex pattern. Delivery of color data from memory is controlled by the displacement of the backing applied to the carpet, by means of clocks generated by the backing linear displacement. Delivery of color data to the yarn control assemblies at each dye station, for dyeing of each yarn end at predetermined positions along its length, is controlled by the displacement of the yarn. Clocks are generated by the yarn linear displacement and control logic circuits to delay delivery of color information to the yarn control assemblies at each dye station depending upon the physical displacement of that station in relation to the other dye stations. Logic circuits are provided to eliminate vibrational and reverse motion effects on the backing and yarn clocks, and to compensate for low yarn speed on starting and/or stopping of the machinery. Logic circuits also are provided to interchange the colors in the pattern of a tufted carpet produced from a given selected pattern that has been scanned.

20 Claims, 48 Drawing Figures

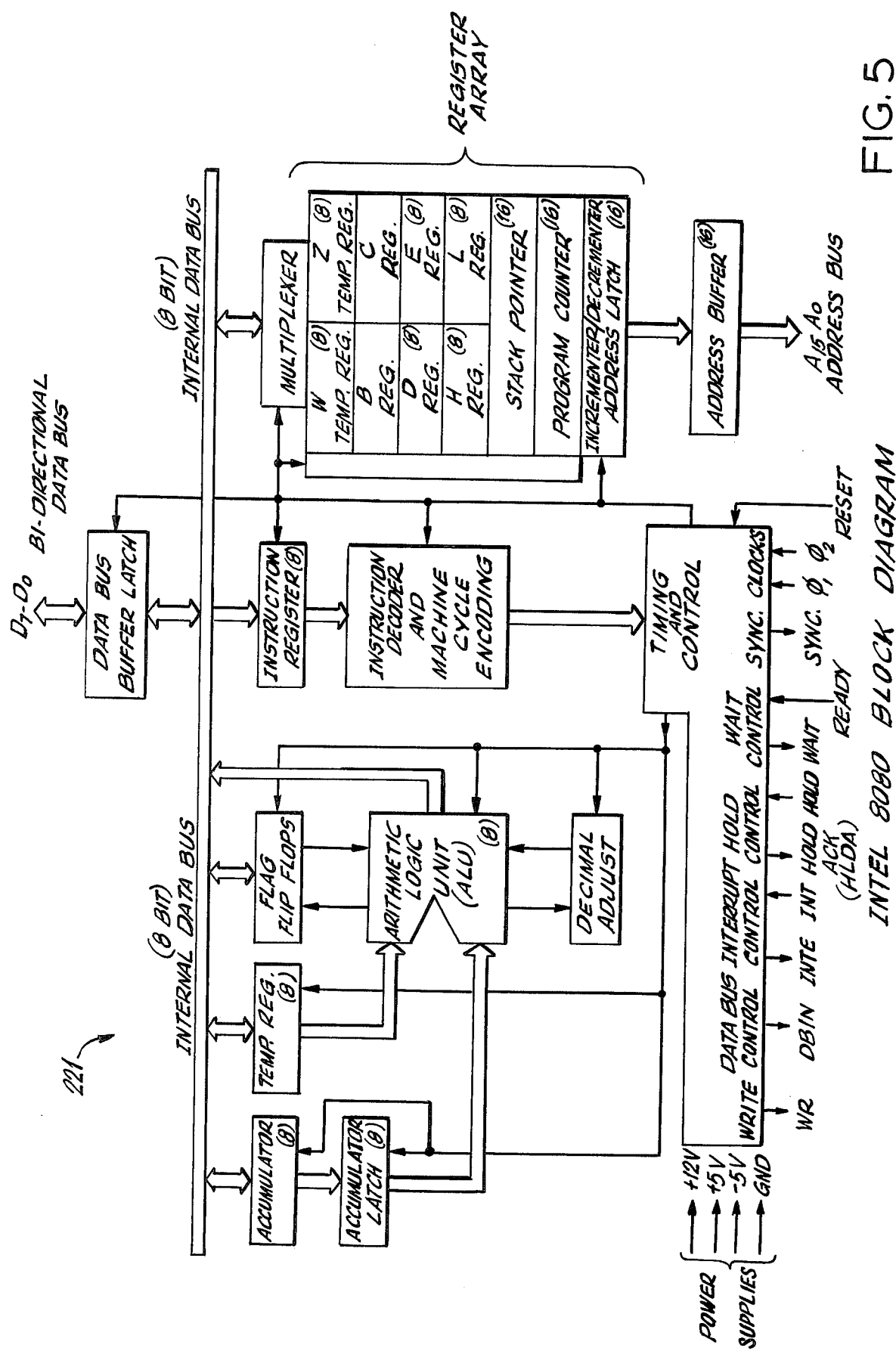
FIG.5 INTEL 8080 BLOCK DIAGRAM

```
 1 0000
 2                    *
 3                    *
 4                    *          TITLE
 5                    *
 6                    *           AND
 7                    *
 8                    *    DESCRIPTIVE MATERIAL
 9                    *
10                    *
11 0800                     ORG $800   RAM MEMORY FIRST ADDRESS
12                  * SN061776*2
13 0800             PROM DS 2    PATTERN DATA ADDRESS VARIABLE
14 0802             PBEG DS 2    PATTERN DATA FIRST ADDRESS
15 0804             WREP DS 1    # PROM WORDS (BYTES/2) FOR WIDTH REP
16 0805             LREP DS 1    # STITCHES BEFORE LENGTH REPEAT
17 0806             SCNT DS 1    STITCH COUNTER
18 0000                     ORG 0      EPROM MEMORY (PROGRAM) FIRST ADDRESS
19 0000   F3                DI         DISABLE INTERRUPTS
20 0001   31 00 09  STRT    LXI SP,$900  SET STACK POINTER LAST RAM+1
21 0004   06 30             MVI B,48   CLEAR ALL SRD BOARDS
22 0006   AF                XRA A
23 0007   D3 03     ZERO    OUT 03     OUTPUT 48 WORDS
24 0009   05                DCR B      (96 BYTES) OF ZEROES
25 000A   C2 07 00          JNZ ZERO
26 000D   3E 02             MVI A,2    CLOCK ZERO DELAY FLIPFLOP
27 000F   D3 04             OUT 04
28 0011   3D                DCR A
29 0012   26 FF             MVI H,255
30 0014   D3 04     DCLK    OUT 04     GEN, 255 DELAY CLOCKS
31 0016   25                DCR H
32 0017   C2 14 00          JNZ DCLK
33 001A   21 00 08          LXI H,PROM  CLEAR ALL PROGRAM VARIABLES
34 001D   AF                XRA A
35 001E   06 09             MVI B,9
36 0020   CD 61 00          CALL STOR
37 0023   DB 05             IN 05      GET PATTERN SELECT DIGISWITCH
38 0025   E6 0F             ANI $F
39 0027   CA C0 00          JZ WALK    0=WALKING TEST PATTERN
40 002A   FE 0F             CPI $F
41 002C   CA EE 00          JZ BAND    F=DYE COLOR TEST PATTERN
42 002F   FE 0E             CPI $E
43 0031   CA 26 01          JZ ONEC    E=ONE COLOR TEST PATTERN
44 0034   47                MOV B,A    CONVERT DIGISWITCH TO PATTERN ADDRE
45 0035   CD 68 00          CALL FIND
46 0038   23                INX H
47 0039   7E        ADDR    MOV A,M    2ND WORD=WREP
48 003A   32 04 08          STA WREP
49 003D   23                INX H      3RD WORD=LREP
50 003E   7E                MOV A,M
51 003F   32 05 08          STA LREP
52 0042   23                INX H
53 0043   22 02 08          SHLD PBEG  PAIR H NOW = PROM DATA 1ST ADDR
54 0046   22 00 08          SHLD PROM
55 0049   DB 04     EXEC    IN 04      GET CLOCKS
56 004B   E6 C0             ANI $C0
57 004D   CA 49 00          JZ EXEC    JMP NO CLKS
58                  *
59                  * SIMULTANEOUS CLOCKS,
```

FIG.8a

```
60                        *   PULSE DELAY CLOCK LAST,
61                        *
62  0050   17                 RAL
63  0051   F5                 PUSH PSW   SAVE YARN CLK
64  0052   DC 81 00        CC STCH      NEW STITCH IF BACKING CLK ON-
65  0055   F1                 POP PSW    RECALL YARN CLK
66  0056   17                 RAL
67  0057   D2 49 00           JNC EXEC   JMP NO YARN CLK
68  005A   3E 01              MVI A,1    OUTPUT 1 DELAY CLK
69  005C   D3 04              OUT 04
70  005E   C3 49 00           JMP EXEC
71                        *
72                        *STORE MEMORY BLOCK
73                        *
74                        *ENTER WITH H,L = FIRST STORAGE ADDRESS
75                        *AND B = NUMBER OF LOCATIONS, A = DATA
76                        *
77  0061   77           STOR  MOV M,A
78  0062   23                 INX H
79  0063   05                 DCR B
80  0064   C2 61 00           JNZ STOR
81  0067   C9                 RET
82                        *
83                        *  FIND REQUESTED PATTERN BY TESTING
84                        *  EVERY 256'TH LOCATION FOR $81 PREAMBLE.
85                        *
86                        *  ENTER WITH B=REQUESTED PATTERN.
87                        *
88                        *  HALT IF CANNOT FIND PATERN ADDRESS,
89                        *
90                        *  EXIT WITH PATTERN PREAMBLE ADDRESS IN H,L
91                        *
92  0068   21 00 40     FIND  LXI H,$4000  1ST ADDR, 1ST PATTERN BOARD
93  006B   7E           FINL  MOV A,M      GET PROM DATA
94  006C   FE 81              CPI $81
95  006E   CA 7C 00           JZ PREA      JMP IF FIND PREAMBLE
96  0071   11 00 01     INCA  LXI D,256    INC MEM ADDR
97  0074   19                 DAD D
98  0075   AF                 XRA A
99  0076   B5                 ORA L
100 0077   B4                 ORA H
101 0078   C2 6B 00           JNZ FINL     JMP IF NOT THRU 65K MEMORY
102 007B   76                 HLT          HALT IF CANNOT FIND REQUESTED PATT
103 007C   05           PREA  DCR B
104 007D   C8                 RZ           RETURN IF THIS IS REQUESTED PATTER
105 007E   C3 71 00           JMP INCA     GO LOOK FOR NEXY PATTERN
106                       *
107                       *OUTPUT ONE STITCH FROM PROM TO SRD
108                       *
109 0081   01 00 00     STCH  LXI B,0      B=WORD CNTR, C=REPEAT CNTR
110 0084   2A 00 08     STCA  LHLD PROM    PROM DATA ADDR TO PAIR H
111 0087   7E           OUTL  MOV A,M      GET PATTERN DATA
112 0088   23                 INX H        MAINTAIN ETA ADDR
113 0089   D3 03              OUT 03       OUTPUT ONE WORD (2 BYTES)
114 008B   04                 INR B
115 008C   0C                 INR C
116 008D   78                 MOV A,B
117 008E   FE 30              CPI 48
118 0090   CA 9F 00           JZ STEX      EXIT IF THRU 96 BYTES (48 WORDS)
```

FIG. 8b

```
119  0893   3A 04 08        LDA  WREP
120  0096   B9              CMP  C
121  0097   C2 87 00        JNZ  OUTL   JUMP IF NOT THRU WIDTH REPEAT
122  009A   0E 00           MVI  C,0
123  009C   C3 84 00        JMP  STCA   GO SET PROM ADDR TO BEGIN OF STITC
124  009F   3E 02      STEX MVI  A,2    CLOCK ZERO DELAY FLIP FLOP
125  00A1   D3 04           OUT  04
126  00A3   3A 06 08        LDA  SCNT   INCR STITCH CNTR AND
127  00A6   3C              INR  A      COMPARE FOR LENGTH REPEAT
128  00A7   32 06 08        STA  SCNT
129  00AA   47              MOV  B,A
130  00AB   3A 05 08        LDA  LREP
131  00AE   B8              CMP  B
132  00AF   EB              XCHG        SET PROM ADDR TO 1ST
133  00B0   2A 02 08        LHLD PBEG   STITCH IF STITCH CNTR=
134  00B3   CA B7 00        JZ   STCB   LENGTH REPEAT
135  00B6   EB              XCHG
136  00B7   22 00 08   STCB SHLD PROM
137  00BA   C0              RNZ
138  00BB   AF              XRA  A
139  00BC   32 06 08        STA  SCNT
140  00BF   C9              RET
141  00C0   06 30      WALK MVI  B,48   WALKING TEST PATTERN
142  00C2   3E 11           MVI  A,$11
143  00C4   CD D3 00        CALL OUTP   OTPUT 48 WORDS (96 BYTES)
144  00C7   05              DCR  B      DECREMENT WORD COUNTER
145  00C8   AF         ZROE XRA  A      SET A=0, AND OUT REMAINING DATA
146  00C9   CD D3 00        CALL OUTP
147  00CC   05              DCR  B      WORD CNT
148  00CD   C2 C8 00        JNZ  ZROE   JMP IF NOT THRU 48 WORDS
149  00D0   C3 C0 00        JMP  WALK
150  00D3   D3 03      OUTP OUT  03     OUTPUT 2 BYTES
151  00D5   26 98           MVI  H,144
152  00D7   3E 02           MVI  A,2
153  00D9   D3 04           OUT  04     SET ZERO DELAY FLIP FLOP
154  00DB   3D              DCR  A
155  00DC   D3 04      DCLO OUT  04     PULSE DELAY CLOCK
156  00DE   25              DCR  H
157  00DF   C2 DC 00        JNZ  DCLO   JUMP IF NOT THRU 24 CLOCKS
158  00E2   21 48 00        LXI  H,$48  WAIT BEFORE EXITING
159  00E5   24         WAIT INR  H
160  00E6   C2 E5 00        JNZ  WAIT
161  00E9   2C              INR  L
162  00EA   C2 E5 00        JNZ  WAIT
163  00ED   C9              RET
164  00EE   21 F4 00   BAND LXI  H,BDAT DYE COLOR TEST PATTERN
165  00F1   C3 39 00        JMP  ADDR
166  00F4   30         BDAT DB   48     WORDS, WIDTH REPEAT
167  00F5   01              DB   1      STITCHES, LENGTH REPEAT
168  00F6   1111            DW   $1111,$1111,$1111,$1111   16 ENDS, COLOR 1
            1111
            1111
            1111
169  00FE   0000            DW   0                        4 UNDYED BETWEE C
170  0100   2222            DW   $2222,$2222,$2222,$2222  16 ENDS, COLOR 2
            2222
            2222
            2222
171  0 08   0000            DW   0
```

FIG.8c

```
172 010A    3333            DW  $3333,$3333,$3333,$3333
            3333
            3333
            3333
173 0112    0000            DW  0
174 0114    4444            DW  $4444,$4444,$4444,$4444
            4444
            4444
            4444
175 011C    0000            DW  0
176 011E    5555            DW  $5555,$5555,$5555,$5555
            5555
            5555
            5555
177 0126    21 2C 01  ONEC  LXI H,BONE  ONE COLOR TEST PATTERN
178 0129    C3 39 00        JMP ADDR
179 012C    01        BONE  DB  1       WORDS, WIDTH REPEAT
180 012D    01              DB  1       STITCHES, LENGTH REPEAT
181 012E    11              DB  $11     ALL DATA=1
            END
```

FIG. 8d

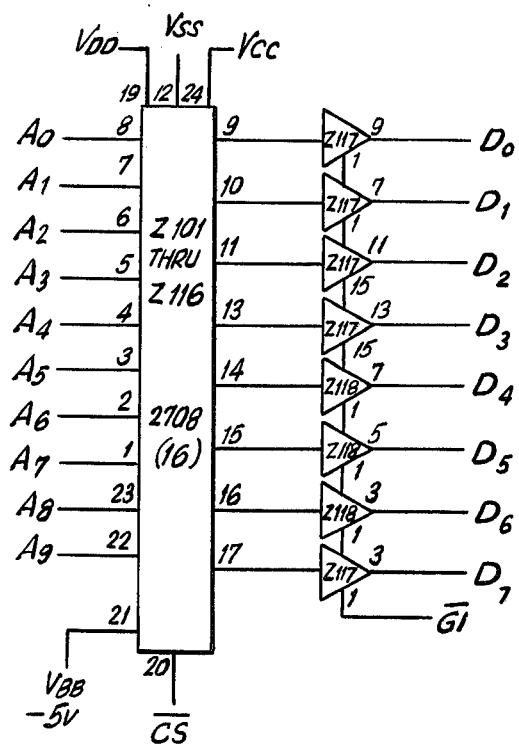
FIG.IOA
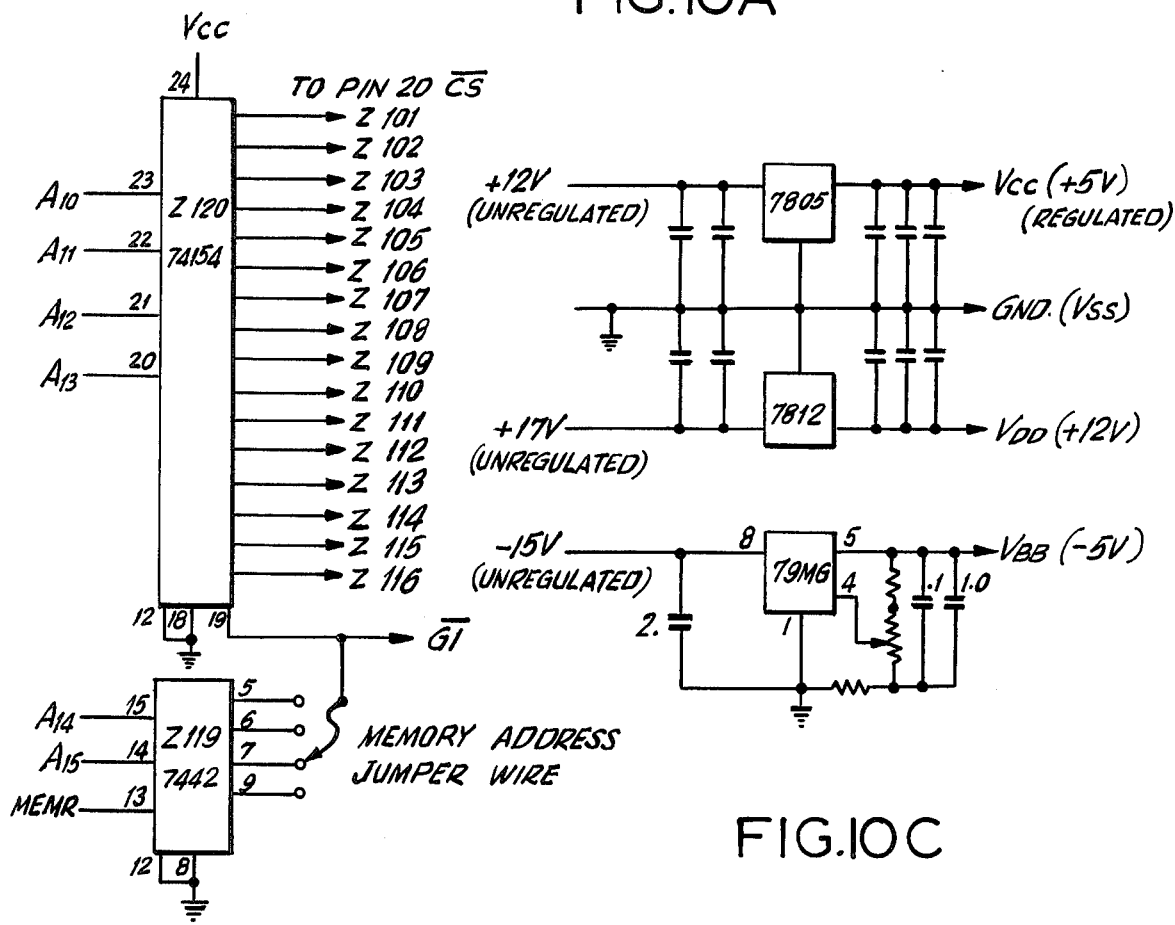
FIG.IOB
FIG.IOC

INPUT / OUTPUT TIMING

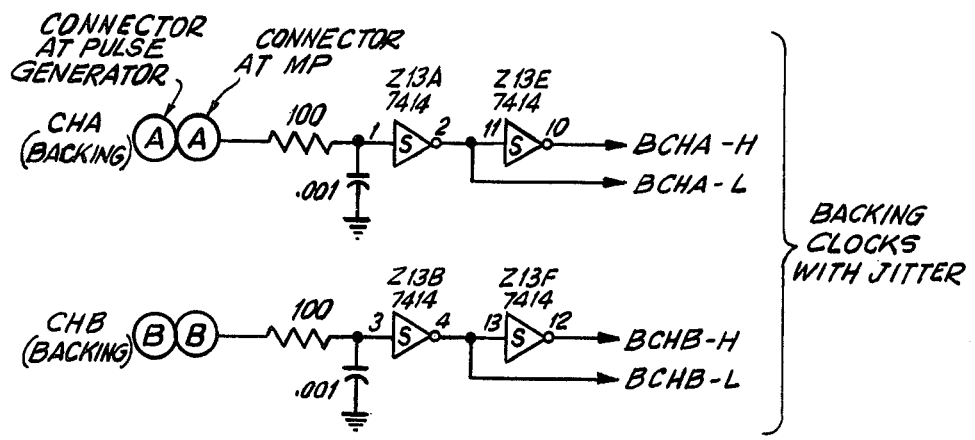
FIG.13A
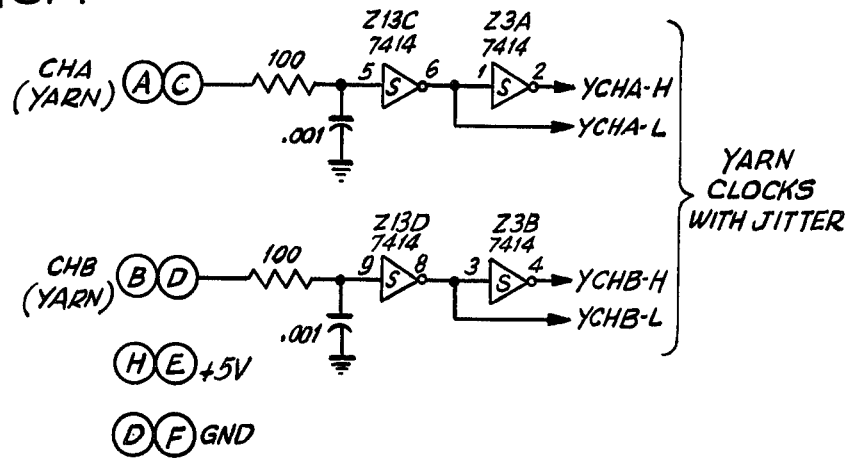
FIG.13B
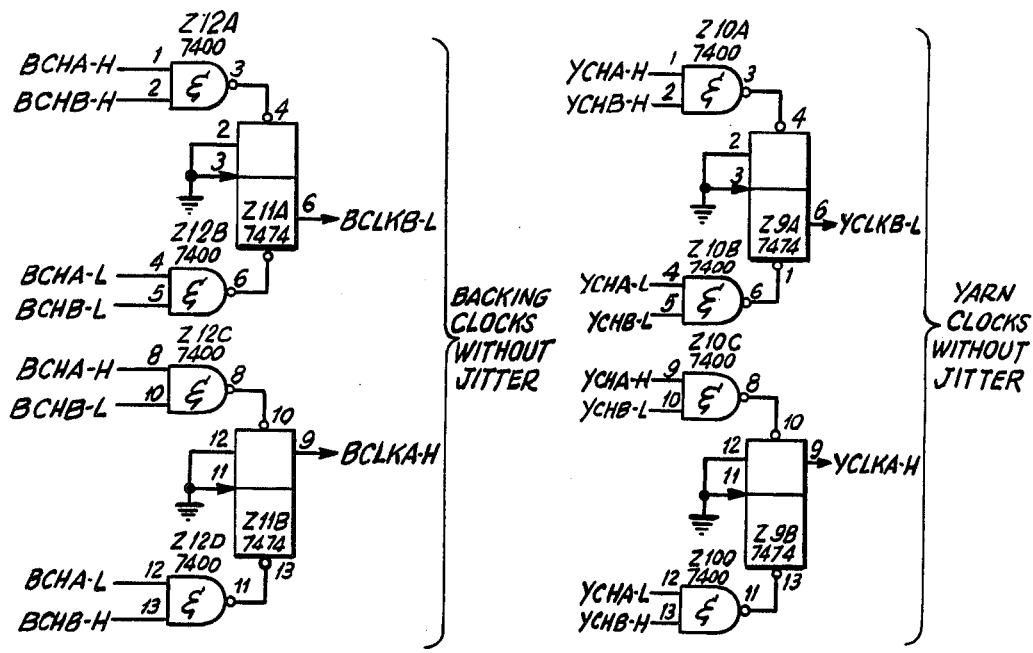
FIG.13C
FIG.13D

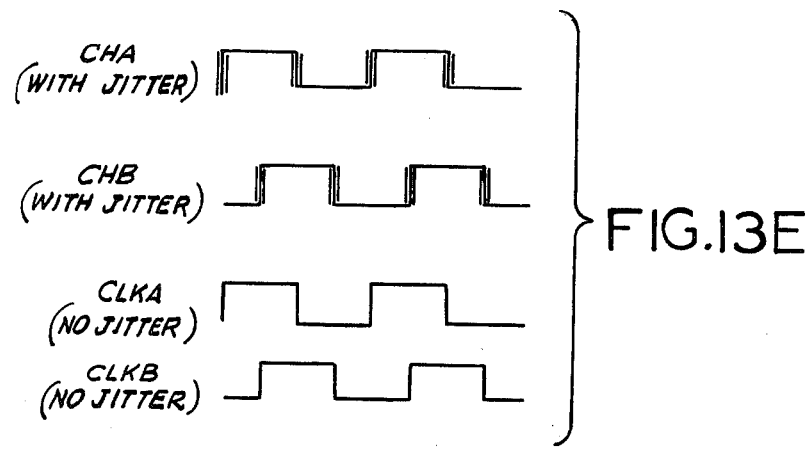
FIG.13E
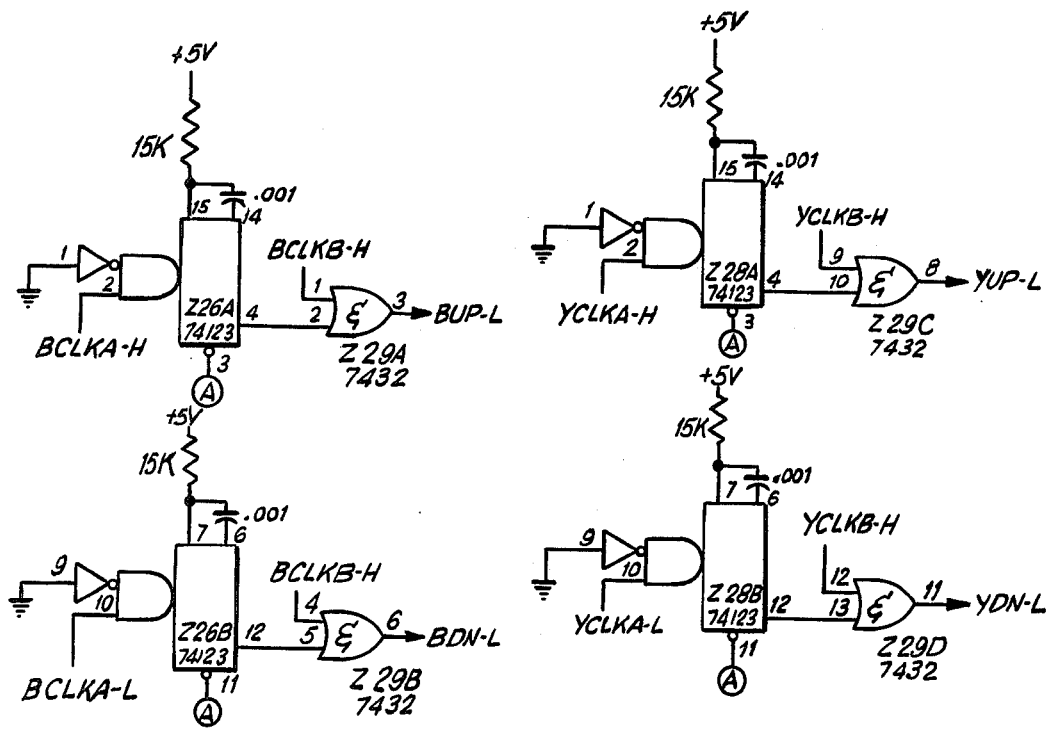
BACKING CLOCK GENERATION
YARN CLOCK GENERATION
FIG.13F
FIG.13G

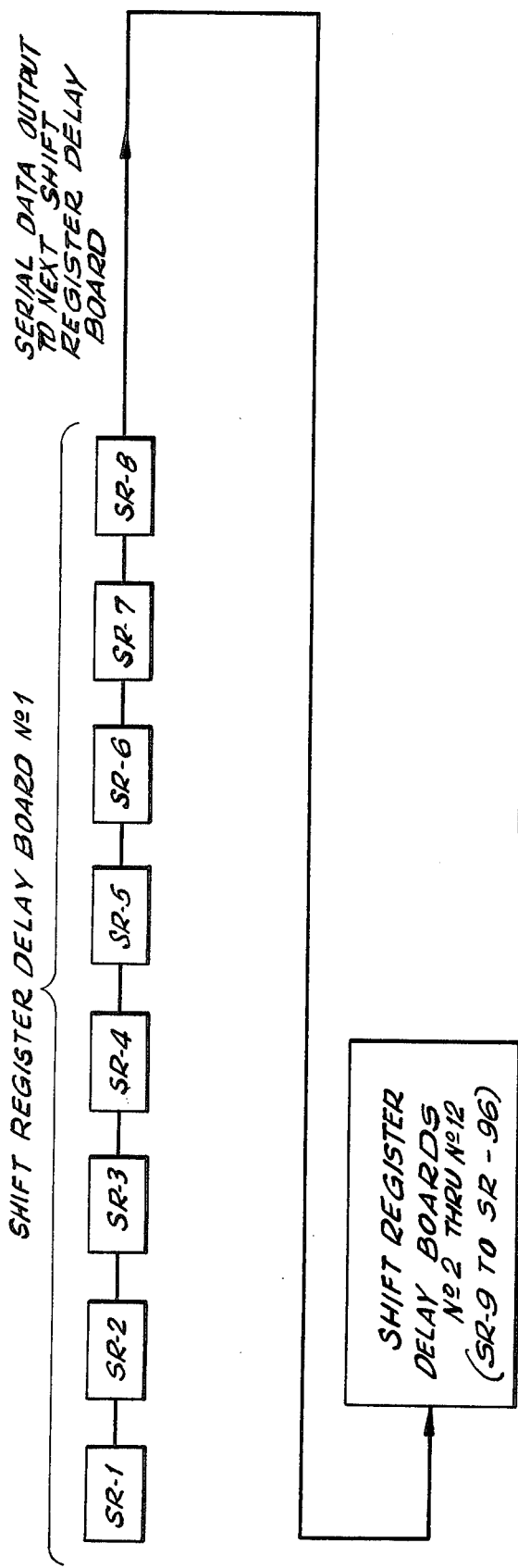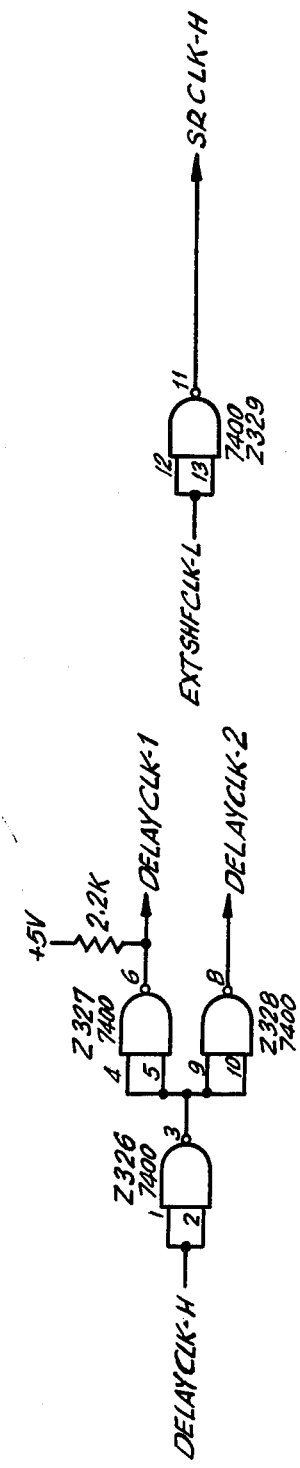

CONTROL APPARATUS FOR TEXTILE DYEING AND TUFTING MACHINERY

BACKGROUND OF THE INVENTION

This invention relates to control apparatus for selective multi-color dyeing of individual yarns and producing therefrom a predetermined complex design in a tufted carpet. The invention particularly relates to carpets made by machines commonly called tufting machines in which yarns fed to individual needles of a continuously reciprocating bank of needles are pushed through a backing sheet to form tufts, stitches or loops that may be cut or remain as uncut pile in the finished carpet.

Heretofore, many variations of tufting machines have been developed which are capable of producing cut or uncut pile of uniform or different heights. A large variety of designs have been produced using one or more or all of said varieties of pile, as well as including color variations.

When using differently colored yarns which have been pre-dyed in bulk, practical considerations have limited production of many desirable designs. When producing floral, modernistic, oriental or other complex designs, different colors have been sprayed on the pile of completed carpets, or have been printed in various ways thereon, to produce the desired design. However, problems have arisen in applying the dyes to finished pile, due to inability to penetrate the pile and to apply the dyes evenly and completely and only in the areas (sometimes very small) where the dye should be and remain.

It has been proposed to apply different colored dyes to the individual yarns at spaced predetermined positions along their lengths, determined with reference to a pattern or design that is ultimately to appear in the finished tufted carpet. Such proposals have generally been impractical and commercially unsuccessful, but one proposal that has succeeded in accomplishing this desired result is disclosed in U.S. Pat. No. 4,015,550, in the names of Bartenfeld, Bryant and Newman for "Apparatus and Method for Selective Multi-Color Dyeing of Individual Yarns and Producing Therefrom a Predetermined Complex Design in a Tufted Carpet". U.S. Pat. No. 4,015,550 is commonly owned by the assignee of the present patent application.

In the above-referenced patent, a multiplicity of yarns are dyed individually at different places along their length with different colors, and are delivered to a tufting machine and fabricated into a carpet bearing a predetermined complex design. This is accomplished without interruption and without variation of the relationship of the yarns, one to another. The yarns are led from a supply in the form of a sheet of yarn and are passed individually over a series of spaced dye pick-up rolls rotating in spaced dye baths of different colors. In the course of the passage, the yarns are lowered into contact with the pick-up rolls by yarn control assemblies for predetermined limited times to cause predetermined variable lengths of the individual yarns to be individually dyed. The colors and lengths of the dyeing are determined by the desired pattern that is to appear as the dyed segments of yarn become loops, tufts or stitches in the carpet fabric.

After dyeing, the sheets of yarns may enter a steam chamber wherein the dye is fixed in the yarn and a drying chamber from which the yarns are individually fed through identical length guide tubes to the conventional tufting machine. Throughout these operations, the positions of the individual dyed yarns relative to one another are maintained so that as they enter the tufting machine they will have the same relationship as when the dyes are applied. Thus, in the carpet fabric, the colored tufts appear in a relationship or pattern which was predetermined before the dyes were applied.

In the above-referenced patent, the pattern controlling the dyeing is laid out on a plurality of drums, one for each dye color. The pattern for each color is prepared and laid out on its respective drum, and controls (through conductive and non-conductive areas, and switch fingers) the lowering of each individual yarn into contact for the predetermined time with the dye pick-up roll for that particular color. A separate pattern drum for each dye color is required because of space problems and overlapping control lines due to hundreds of yarn control assemblies required to lower the individual yarns into contact with particular dye pick-up rolls. Further, due to the longitudinal spacing along the length of the machine of the yarn control assemblies and dye rolls, the zero or starting point of the patterns as laid out on the pattern drums is different on each drum. In other words, the controlling action of the drums must be coordinated; and the start of the patterns on the drums for the dye pick-up rolls displaced down the machine from the first dye pick-up roll must follow the start of the first drum by the amount of time taken for the yarn to travel from the first dye pick-up roll to the succeeding dye pick-up rolls.

The present invention is directed to a highly versatile electronic control system which also eliminates the need for the several pattern drums.

SUMMARY OF THE INVENTION

According to the present invention, a multiplicity of yarns are dyed individually in the general manner described in the above-referenced patent, which patent is incorporated into the present application by reference. In the present invention, a replica or artist's rendition of the multi-colored pattern to be reproduced in tufted carpet is scanned. The scanned color data is converted to digital information which may be stored on a digital storage medium such as punched paper tape, and which may later be transferred to an erasable programmable read only memory (EPROM) forming a part of the control system of the present invention. Several EPROM integrated circuit chips are located on one board, and may contain color data information for several carpet patterns of different design. Addressing means are provided for a microprocessor to locate the beginning of a particular pattern on a particular chip, and to output desired pattern information.

A backing clock generated through the physical displacement of the carpet backing controls the output of data from the EPROM to shift registers. A yarn clock generated through the physical displacement of yarn moving along the machine controls the clocking of yarn color data from the shift registers through shift register delays to operate the solenoid activated yarn control assemblies and dye predetermined sections of individual yarns with the correct dye colors when the predetermined sections reach the appropriate dye baths. clocking of the yarn control data through shift register delays compensates for the linear displacement of the dye pick-up rolls from one another along the machine. As an example, when two directly adjoining sections of an individual yarn end are to be dyed a first and a second color by two dye pick-up rolls spaced a number of feet apart, dye of a first color from the first dye pick-up roll is applied to the predetermined section of the yarn. A shift register delay of the correct length clocked by the yarn displacement between the two spaced dye pick-up rolls then applies a signal at the correct instant to activate the yarn control assembly at the second dye pick-up roll and to cause the dye of the second color to be applied to the section of the yarn end directly adjoining where the dye of the first color was applied. In the embodiment disclosed in the present application, five separate dye baths with dye pick-up rolls are spaced apart from one another, and 96 yarn control assemblies are associated with each dye bath.

Interface logic circuitry connected between the microprocessor and the shift registers and shift register delays generates signals controlling operations of the machine. Circuits in particular are provided for decoding, and to generate backing and yarn clocking signals free of vibrational and reverse motion effects, to control the output of particular pattern information from EPROM and deliver the information to the shift registers, to provide various other control signals, and to compensate for low yarn speeds when starting and/or stopping the machine. Also provided in the interface circuitry are circuit means whereby when a particular pattern or particular color information is selected from EPROM to be tufted into carpet, individual colors making up the tufted pattern may be interchanged among the different colors available in the dye baths.

The present invention presents the advantage of being able to tuft multi-colored complex patterns through the dyeing of different colors on predetermined portions of individual yarns, all without the necessity of complex and expensive mechanical pattern controlling arrangements for each pattern to be tufted. Considerable system flexibility is also provided by the electronic control means, and pattern changes may be quickly and economically implemented on the tufting machine.

Of particular utility is the arrangement whereby two independent synchronizing devices, the yarn and backing clocks, are generated respectively through the displacement rather than the speed of the yarn and backing. This permits exact control of the placing of different adjoining dye colors along individual yarn ends; and in the tufted carpet, allow changes in pile height and number of tufting stitches per unit of carpet length to be made without distorting the desired pattern.

Also of great advantage is the ability to interchange colors within a desired pattern, as a flexible design and manufacturing tool. It will be appreciated that multicolored complex patterns will appear visually very different when the colors of the pattern are interchanged, even though the outline configurations of the pattern do not change. In the present invention, switches connected to the interface circuitry permit the colors of a given pattern to be interchanged so that small sections of a carpet may be tufted having the same pattern outline configurations but having the individual portions of the pattern in different selected color combinations. In this manner a very effective design tool is presented, to allow quick and economical selection for marketing of the most aesthetic color combinations in the given pattern. Without such an arrangement, complicated mechanical rearrangements or numerous and expensive artistic renditions would be required to obtain the same result.

Other objects and advantages of the present invention will become apparent as it is described in connection with the drawings.

DESCRIPTION OF THE DRAWINGS

In the drawings.

FIG. 5 is a block diagram of the microprocessor integrated circuit chip of FIG. 4;

FIGS. 8A–8D contain a control program used with the microprocessor and other circuitry of the present invention;

FIGS. 10A–10C illustrate logic means for addressing individual EPROM integrated circuit chips of FIG. 7, and for addressing and outputting pattern information from each chip;

FIGS. 13A–13G illustrate the logic means by which the backing and yarn clock pulses are derived and generated, and the manner in which machine vibrational effects and yarn and backing reverse motion effects are eliminated in the present invention;

FIGS. 19A–19E illustrate the shift register delay boards, individual shift registers and shift register delays on the shift register delay boards, and control signals, all utilized in the present invention to clock pattern data to the solenoid actuated yarn control assemblies.

DESCRIPTION OF THE INVENTION

Figure 1:
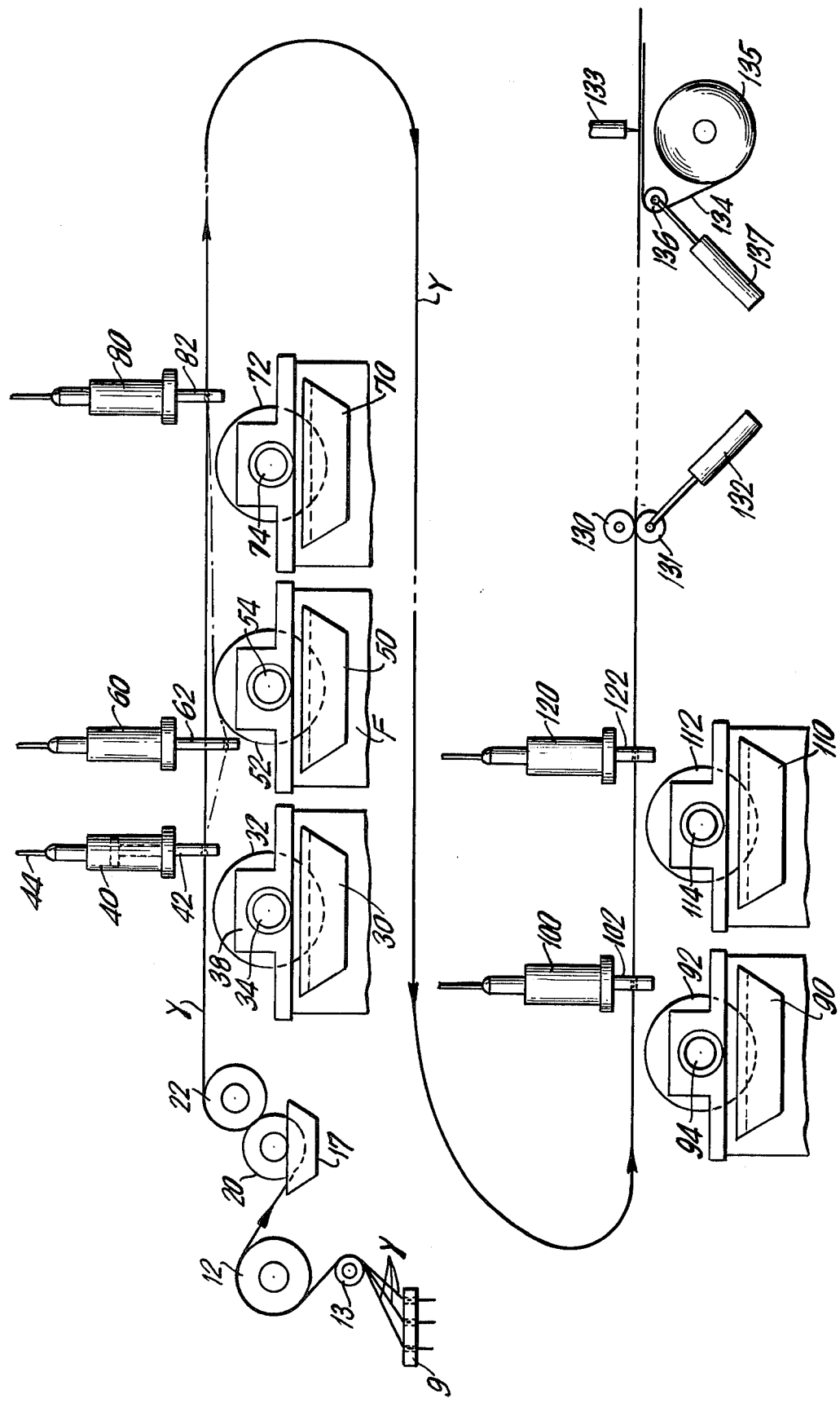
FIG. 1 is an elevational view showing diagramatically the mechanical arrangement of the dye baths, yarn control assemblies, tufting station and yarn and backing displacement sensors of the present invention.
Figure 20:
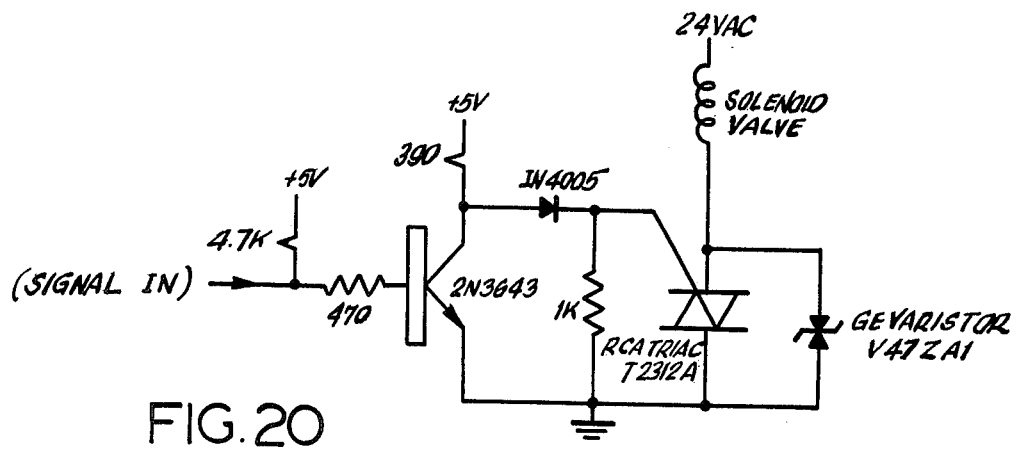
FIG. 20 illustrates solenoid driver circuitry utilized in the present invention to drive the solenoids controlling the yarn control assemblies.

Dye Baths, Yarn Control Assemblies, Tufting Station and Yarn and Backing Displacement Sensors Referring to FIGS. 1 and 20 of the drawings, the undyed yarns Y from a creel or spools are spread into the form of a sheet and are threaded up through a horizontal yarn guide plate 9 having several rows of staggered holes, from which the yarns pass around a horizontal idler roll 13 and around and over a parallel draw roll 12 mounted on a horizontal shaft 12s supported in bearing 13b in the machine frame F above the idler roll 13. The draw roll has a rough surface and is power driven and pulls the yarns from the supply. The machine frame F may be of any suitable form and number of parts to support the various elements of the machine as described herein.

In order to prepare and condition the yarns so that they will pick up and retain dyes, later to be applied at predetermined sections along the length of the yarns, a bath 17 is provided of common wetting, cleansing, and anti-foaming agents. The yarn sheet passes from the draw roll 12 into the bath under the first (20) of a pair of parallel horizontal squeeze rolls 20, 22 which are mounted on shafts 23, 25 journalled in bearings in bearing blocks 29, 29' supported from the machine frame at each end of the rolls. The passage of the yarns between the squeeze rolls leaves the yarns with about 80% moisture content. From these rolls, the yarns go directly to dyeing apparatus which in the example illustrated is provided with means to apply five colors in succession at spaced points along each individual yarn end.

Figure 3:
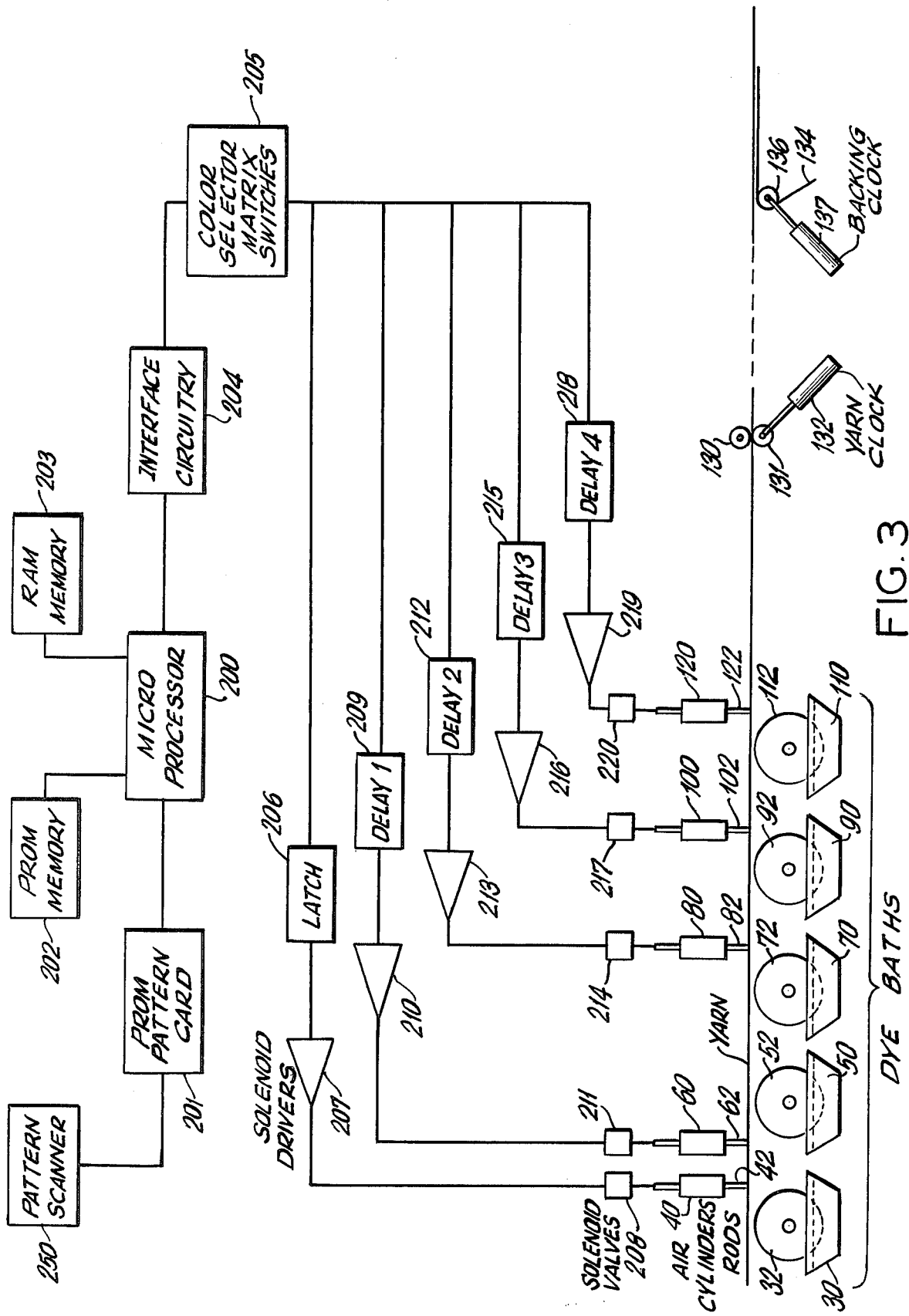
FIG. 3 is a simplified schematic illustration of the overall control system of the present invention.

In order to apply dye at spaced positions along the yarns, five (or more or less) identical stainless steel dye pick-up rolls 32, 52, 72, 92, 112 are provided, mounted on shafts 34, 54, 74, 94 and 114, and positioned over the dye baths 30, 50, 70, 70, 110, containing dyes of different colors and additive chemicals to assist adherence of the dyes to the pick-up rolls, to penetrate the yarn, to fix the dye to the fibers and to reduce foam. FIG. 1 is drawn as shown by reason of space limitation, but it will be appreciated that dye baths 30, 50, 70, 90 and 110 generally extend along a line in the actual machine as shown in FIG. 3. The lower part of each roll is immersed in the bath and picks up dye as the roll turns. The shafts 34 of roll 32 is journalled in bearings in bearing clocks 38, and the rolls 52, 72, 92, and 112 are similarly supported.

Above each pick-up roll is mounted a bank of yarn control assemblies extending parallel to the axis of the rolls (transversely into the plane of FIG. 1). In the embodiment of the invention herein described, a total of 96 such assemblies above each pick-up roll extends parallel to the axis of that roll. The desired carpet width dictates the number of yarn ends controlled by a single yarn control assembly. For example, if the carpet width has 96 ends, 1 yarn end is controlled by each yarn control assembly. If the carpet width has 2 × 96 yarn ends, 2 yarn ends are controlled by each of the 96 yarn control assemblies. The needles are threaded at the tufting machine in such a manner that the pattern repeats across the width after 96 ends. Pattern repeats of less than 96 ends are achieved electronically by duplicating the data. Wider patterns with no width repeats can be handled by more than 96 yarn control assemblies above each pick-up roll.

Figure 2:
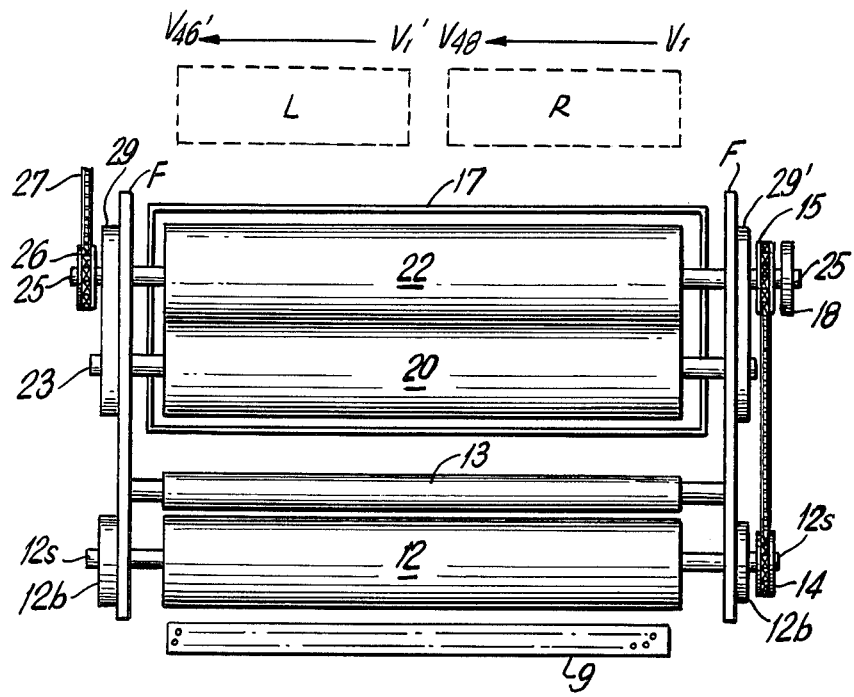
FIG. 2 is a plan view of the end of the apparatus of FIG. 1 where a sheet of yarn enters the system, also illustrating diagramatically the arrangement of the solenoid valves over each dye bath for controlling the yarn control assemblies associated with each bath.

Each individual yarn control assembly comprises a vertically mounted pneumatic cylinder (40, 60, 80, 100, 120, etc.), containing a plunger with a stem or piston rod (42, 62, 82, 102, 122, etc.) extending out the lower end in a position offset from directly vertical position over its roll. The rod is normally biased upwardly by a coiled compressing spring within the cylinder. A conventional electromagnetically operated solenoid valve controls inlet and exhaust of air to and from the cylinder through a connection 44 to an air supply. For the 96 yarn control assemblies extending parallel to the axis of roll 32, solenoid valves $V_1$ to $V_{48}$ on the R side, and solenoid valves $V_1'$ to $V_{40}'$ on the L side, are shown diagramatically in FIG. 2. Rolls 52, 72, 92 and 112 similarly each have 96 yarn control assemblies extending parallel to the axis of each roll, with each yarn control assembly being identically controlled by a solenoid valve as shown diagramatically in FIG. 2. Thus in the machine described with 96 yarn control assemblies controlled by 96 solenoid valves at each of the five dye pick-up rolls, there are a total of 480 yarn control assemblies and 480 solenoid valves for the machine.

The individual yarn ends pass through openings at the lower end of the downwardly extending portions of the piston rods. Each of the assemblies is placed so that when its piston and rod are down, the yarn end(s) it carries will be pushed down into contact with the adjacent pick-up roll. In FIG. 1, it is assumed that rods 42, 62, 82, 102 and 122 carry the same yarn end(s). Rod 42 controls the position of the yarn end(s) that it carries between the squeeze roll 22 and itself. In the inactivated position the rod 42 is up, in the position shown in FIG. 1, and the yarn is out of contact with the pick-up roll 32. When activated, the rod 42 moves down carrying the yarn into contact with the pick-up roll 32.

In corresponding fashion, when the rod 62 of the assembly associated with roll 52 is inactivated and in its up position, the yarn is held from contacting the roll 52, whether or not the rod 42 is activated. But when rod 62 is activated, it moves down and carries the yarn into contact with pick-up roll 52 as shown in dashed lines in FIG. 1. Likewise, when each rod of each yarn control assembly is up, the yarn it carries is held from contacting the pick-up roll associated with that yarn control assembly, whether or not the rod of any other yarn control assembly is activated.

Since the yarn is constantly moving forward through the machine, each yarn end will be dyed with different colors along its length. The places where a particular color is applied will depend on when each particular yarn control assembly associated with a given yarn end(s) is activated. As shown in FIG. 1, the yarn control assemblies having rods 42, 62, 82, 102 and 122 manipulate one or more yarn ends. Thus a large variety of color sequences along each yarn end(s) is possible. Since each bath has 95 other corresponding yarn control assemblies each manipulating a different yarn end(s), a large variety of colorings of yarns can be obtained transversely across the sheet since the adjacent yarn ends which are carried by individual transversely adjacent yarn control assemblies can be dyed entirely independently of each other. The colors dyed in each individual yarn, and thus in the yarn ends transversely across the sheet, are determined from multi-color complex pattern data stored in EPROM memory as hereinafter described.

After the final dye bath 110 has been passed by the yarn ends, the yarn sheet goes through yarn drive rolls 130, 131. The shaft of yarn drive roll 131 is connected to yarn clock pulse generator 132, so that yarn clock pulse generator 132 senses through the shaft rotation of drive roll 131 the physical displacement of the yarn sheet as it moves across the dye baths. Yarn clock pulse generator 132 provides a constant number of pulses per unit length of yarn travel to the microprocessor. The yarn sheet then may pass to a conventional steam chamber (not shown) and/or drying chamber (not shown) to set and dry the yarn. Thereafter, the yarns are passed to the tufting machine 133 (diagramatically shown) in a manner more fully described in the above-referenced U.S. Pat. No. 4,015,550.

At the tufting machine 133, backing roller 135 provides the carpet backing 134 to the tufting machine, the backing 134 passing first over drive roll 136. Connected to the shaft of roll 136 is backing clock pulse generator 137, so that backing clock generator 137 senses through the shaft rotation of drive roll 136 the physical displacement of the backing as it moves into the tufting machine 133. Backing clock pulse generator 137 provides a constant number of pulses per unit length of backing travel to the microprocessor.

Further details of the system described above are found in the above-referenced patent, incorporated herein by reference.

Description of Overall Control System

Figure 4:
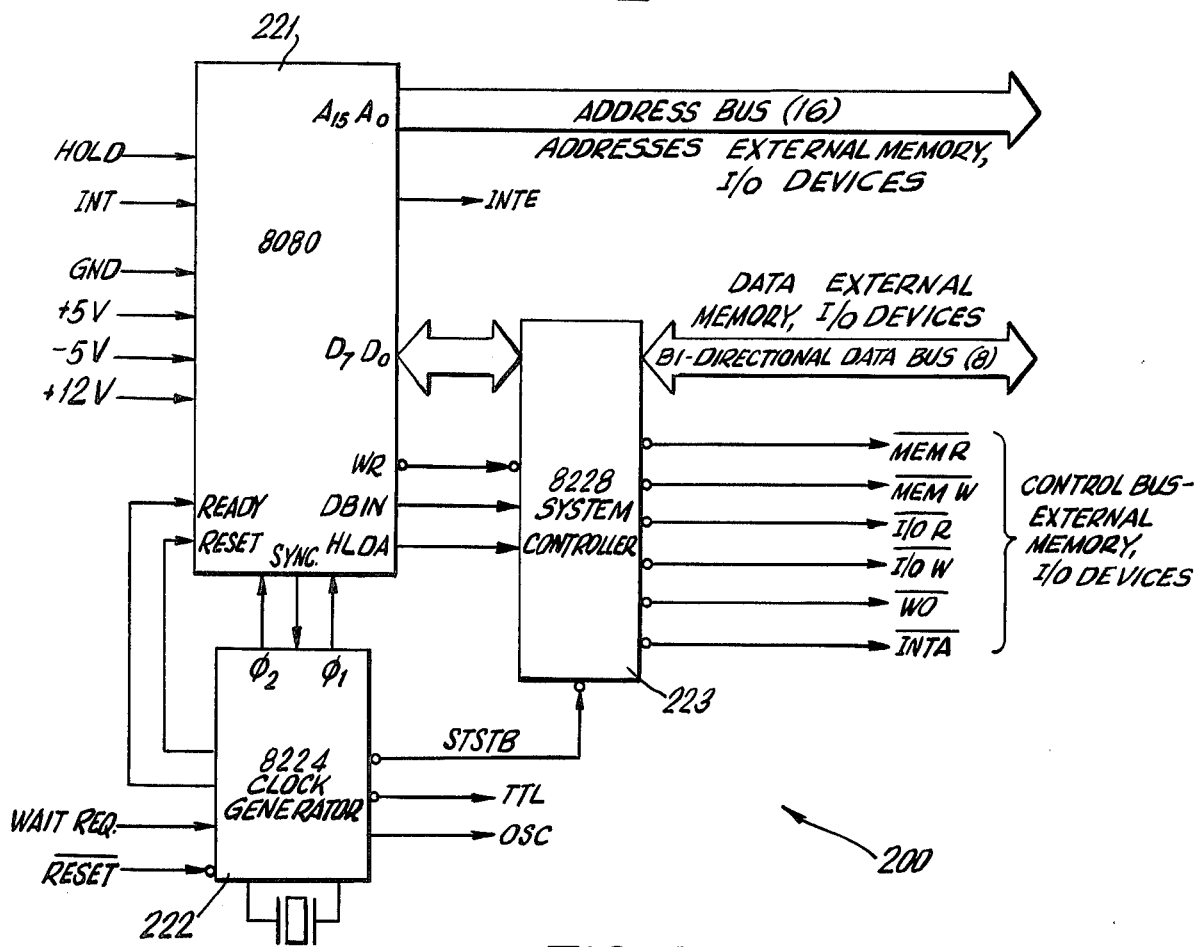
FIG. 4 is a block diagram of the microprocessor, system controller and clock generator used with the present invention.
Figure 6:
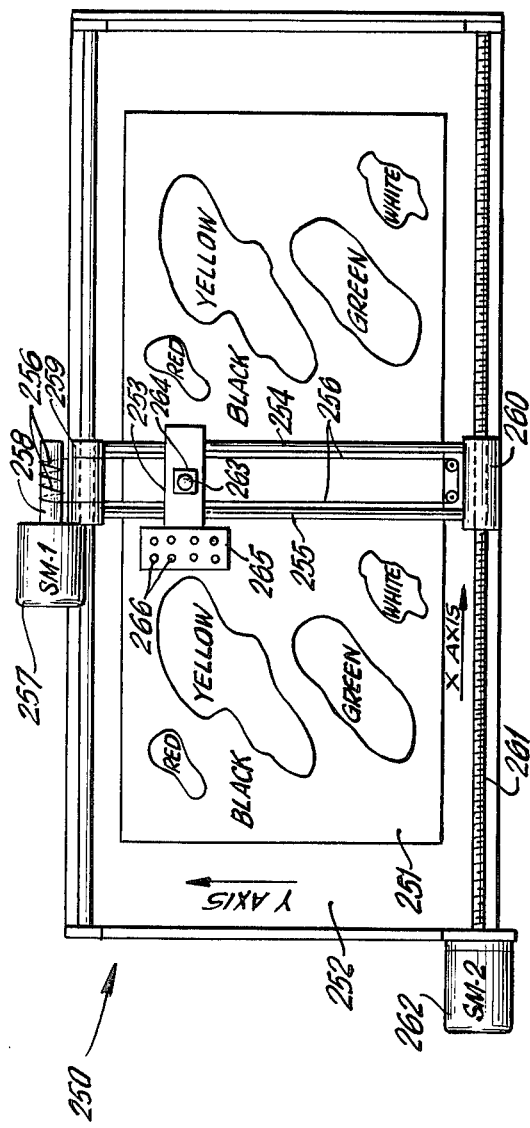
FIG. 6 is a plan view of an example of a pattern scanner suitable for use with the present invention.

FIG. 3 is a simplified schematic illustration of the control system for controlling the 480 yarn control assemblies in the described embodiment of the present invention. An artist's rendition of a multi-colored complex pattern is scanned for color data by a scanner 250 such as illustrated in FIG. 6. The scanned color data is electronically digitized and stored on PROM pattern card 201 (FIGS. 7 and 10A–10C) and addressable by microprocessor 200 (FIGS. 4 and 5). A control program (FIGS. 8A–8D and 9) for the microprocessor is stored in PROM memory 202, with RAM (random access memory) memory 203 serving as a working memory for the microprocessor. Interface circuitry 204 (FIGS. 12A–12B, 13A–13G, 14A–14C, 15, 16A–16I, 17 18A–18C) connects microprocessor 200 through color selector matrix switches 205 (FIG. 17) for color switching and to latch 206 and delays 209, 212, 215 and 218 (FIGS. 19A–19B), which in turn are respectively connected to solenoid drivers 207, 210, 213, 216, 219 (FIG. 20) and solenoid valves 208, 211, 214, 217, 220 ($V_1$ to $V_{48}$(R) and $V_1'$ to $V_{48}'$ (L), FIG. 2) to operate air cylinders 40, 60, 80, 100, 120 (FIG. 1) and rods 42, 62, 82, 102, 122 (FIG. 1) above dye pick-up rolls 32, 52, 72, 92, 112 (FIG. 1) rotating in dye baths 30, 50, 70, 90, 110 (FIG. 1). Color pattern informationn for each yarn end in each stitch (each line of color data scanned across the width of a pattern) is presented from PROM pattern card 201 to latch circuits 206 and delay circuits 209, 212, 215 and 218 under control of backing clock 137. The color information for each stitch is clocked through the latch and delay circuits under control of yarn clock 132, with the delay circuits 209, 212, 215 and 218 being of increasing lengths in that order to compensate for the physical distance the yarn ends must travel between dye pick-up rolls 32, 52, 72, 92 and 112. The length of these delays corresponds directly to the physical displacement of the dye pick-up rolls. FIGS. 1 and 3 are not intended to show a physical displacement of the pick-up rolls to scale, but in the embodiment of the invention described herein, the spacing between pick-up rolls 32–52 and 72–92 is half that of the spacing between rolls 52–72 and 92–112.

It will further be appreciated from the previous description that 96 air cylinders and rods (including cylinder 40 and rod 42) extend above and parallel to the axis of dye pick-up rolls 32, 96 air cylinders and rods (including cylinder 60 and rod 62) extend above and parallel to the axis of dye pick-up roll 52, and 96 of the yarn control assemblies (each comprised of a cylinder and rod) similarly extend above and parallel to the axis of each of the dye pick-up rolls 72, 92 and 112. Solenoid valves 208, 211, 214, 217 and 220 each are symbolic of a separate set of 96 solenoid valves $V_1$ to $V_{48}$(R) and $V_1'$ to $V_{48}'$ (L) above each dye pick-up roll as shown diagramatically in FIG. 2, with each individual solenoid valve, under the influence of a solenoid driver, operating each individual yarn control assembly according to color data information clocked through a latch or delay circuit associated with that particular valve. Latch 206 and delays 209, 212, 215 and 218 are symbolic of latch or delay circuits associated with each of the 480 yarn control assemblies in the described embodiment of the present invention.

Pattern Scanner

Referring to FIG. 6, a suitable form of pattern scanner 250 is illustrated. Pattern 251, the pattern to be scanned, is placed on and affixed as by tape to flat board 252. Pattern 251 may be an artist's rendition of the pattern to be tufted, and is a multi-colored complex pattern having for example a number of different outline configurations of different colors such as shown.

Cursor 253 having a lens 264 therein containing a central viewing circle 263 rides along carriage members 254 and 255. Wire cable 256 is connected to the cursor 253 and to shaft 258 of stepper motor 257 as shown. Carriage members 254 and 255 are integrally connected to carriage members 259 and 260, with stepper motor 257 being attached to carriage member 259. Stepper motor 257, through shaft 258 and wire 256, serves to drive cursor 253 with its lens 264 along the Y axis (carpet width) of the pattern to be scanned.

Also connected to and riding along with cursor 253 is a keyboard 265 having buttons 266 thereon for recording color information with regard to the pattern 251 being scanned.

Carriage member 260 is in turn connected to screw drive 261 which is driven by stepper motor 262. Stepper motor 262, through screw drive 261, serves to drive cursor 253 with its lens 264 (as well as the assembly of carriage members 254, 255, 259 and 260, wires 256, stepper motor 257 and keyboard 265) along the X axis (carpet length) of the pattern to be scanned.

In operation, cursor 253 is positioned by stepper motors 257 and 262 at the lower left corner of pattern 251, the position representing the first needle of the first stitch of the carpet to be tufted. An operator viewing through viewing circle 263 sees one of the five colors (in the embodiment of the invention here described) of the pattern 251, which five colors are also contained in the five dye baths previously described. The operator pushes the particular button on keyboard 265 assigned to the color viewed, to record a discrete color data point. By conventional and known means, that color recorded may be electrically transferred to and stored in logic circuits, and stepper motor 257 is then actuated to index the cursor 253 one position along the Y axis in the upward direction. A microprocessor may serve to transfer and store the recorded color data, and also operate the stepper motors 257 and 262. The operator will view the color of the pattern at this next index position through viewing circle 263, and will push the button on keyboard 265 assigned to the color viewed. This color information will be similarly stored, and the cursor 253 is then indexed to the next viewing position along the Y axis by stepper motor 257. In similar fashion, color information will be viewed and recorded for each index position along the Y axis until the top of the pattern is reached (a stitch of information then having been recorded), at which point stepper motor 262 will index cursor 253 one position along the X axis. Cursor 253 will then index down the Y axis under the control of the stepper motor 257, viewing position by viewing position with the viewed color information being similarly recorded, until the bottom of the pattern 251 is reached (a second stitch of pattern information then having been recorded). At that point, stepper motor 262 will index cursor 253 one position to the right along the X axis, and stepper motor 257 will index the cursor 253 upwardly through a new viewing stitch of color data along the Y axis. These operations will continue along the Y and X axes in the same described fashion until the entire pattern has been scanned and its color information has been recorded and stored.

Since the needles in the tufting machine previously referred to are spaced 3/16 of an inch apart, lens 264 is of a size to view a 3/16 of an inch square of the pattern being scanned, with central viewing circle 263 viewing the center of the square for accuracy. Each indexing of cursor 253 by stepper motors 257 and 262 is through a 3/16 inch linear displacement (either along the X axis or the Y axis) to arrive at the next viewing position for the operator. Each viewing position is a discrete data point, and the scanned pattern is therefore converted to a multiplicity of discrete data points.

Keyboard 265 in the embodiment of the invention herein described includes five color buttons, one for each of the five colors of the scanned pattern (the five colors in the five dye baths), as well as three buttons to respectively start the scanning operation, repeat color information, and delete color information when the operator makes an error.

Each pattern 251 being scanned may be intended to be repeated one or more times along the Y axis (width) in the carpet to be tufted, and to be repeated one or more times along the X axis (length) in the carpet to be tufted. The scanned color data descriptive of the pattern may be recorded and preserved on punched paper tape by conventional known means, as well as control information from a teletype identifying the pattern and identifying the number of width and/or length repeats for the pattern in the carpet to be tufted. On the paper tape, a frame of 8 bits in ASCII code may define each data point of color information. All of this information may then be read into a computer and recorded as binary information on the PROM pattern card 201 used in the embodiment of the invention herein described. The tape may be retained for future use.

In addition to the scanner described above as an example, several other pattern scanning means are commercially available. A further possible scanning means may be found in Strother and Blackstone U.S. Pat. No. 3,722,434, issued Mar. 27, 1973, with suitable conversion to color sensing optical means (a multiple photocell scanning head with appropriate color filters to detect the various colors) and associated circuitry.

PROM Pattern Card

Figure 7:
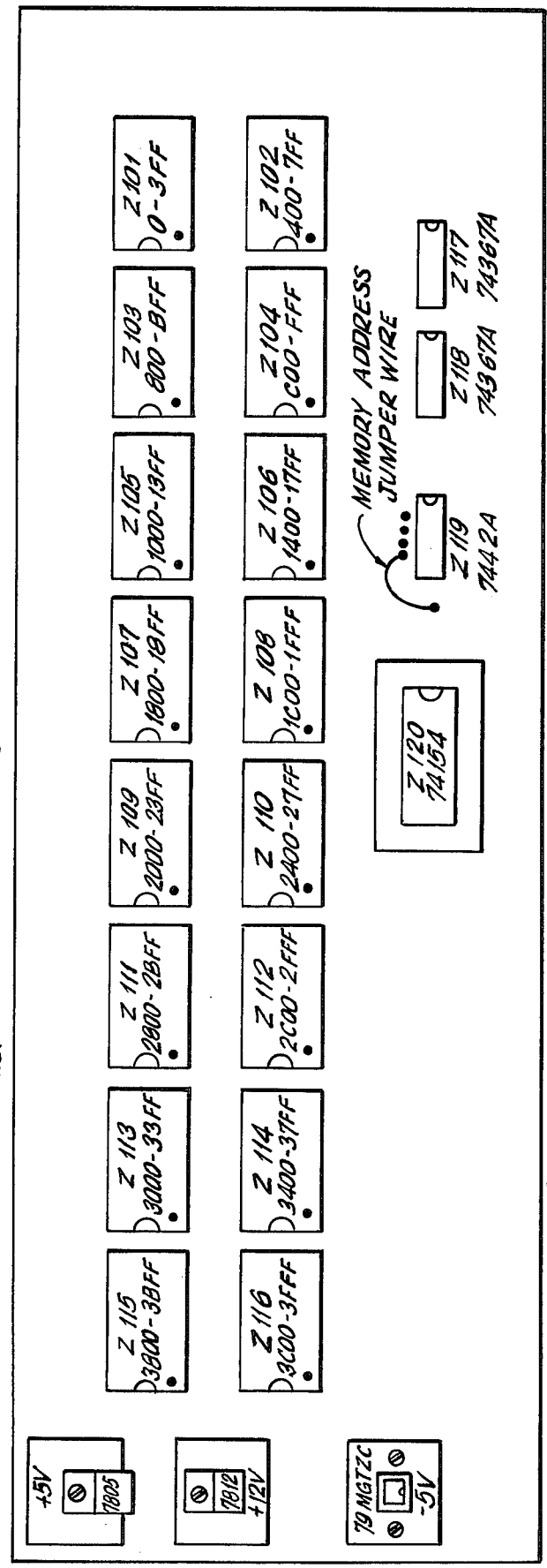
FIG. 7 is a diagram of a printed circuit board containing EPROM integrated circuit chips used with the present invention for storing patterns to be tufted.

Referring to FIG. 7, PROM pattern card 201 is illustrated. Located on printed circuit card 201 are sixteen erasable programmable read only memory (EPROM) Intel integrated circuit chips 2708, designated Z 101 to Z 116. Noted in FIG. 7 on the EPROM chips Z 101 to Z 116 are the addressable memory locations contained on each chip (hexadecimal). Further contained on card 201 are tri-state driver integrated circuit chips Z 117 and Z 118 (each a 74367A integrated circuit chip), and decoding chips Z 119 and Z 120 (Z 119 being a 7442A integrated circuit chip and Z 120 being a 74154 integrated circuit chip). Also located on card 201 at the left hand side are three voltage regulators establishing card voltages of +5 volts (regulator 7805), +12 volts (regulator 7812) and −5 volts (regulator 79MGT2C).

Card 201 in total contains a memory capacity of approximately 16K words (8 bits each). Each memory chip Z 101 to Z 116 is separately removable from card 201, and has color information from scanned patterns stored on it by techniques well known to those skilled in the art. For example, the color information scanned from a pattern may have been recorded on punched paper tape, which is then read into a computer and entered onto the EPROM chips, one chip at a time. The chips Z 101 to Z 116 herein disclosed are erasable by ultraviolet light, so that when there is no current need for the pattern information on a given chip, it may be erased for the subsequent entry of new multicolored complex pattern information.

The means for addressing each of chips Z 101 to Z 116, and particular information on each chip, is hereinafter disclosed.

Chips Z 101 to Z 116 will contain, as to each pattern, a pattern identifying preamble, information on the number of needles before a width repeat, information on the number of stitches before a length repeat, and the actual pattern data. Each pattern may occupy a portion of a chip, or several chips. The first pattern word is the pattern identifier (hexadecimal 81), the second pattern word is the pattern width repeat (WREP), the third pattern word is the pattern length repeat (LREP), and pattern data follows in subsequent words with the color data for each yarn end in each stitch. Data is stored as eight bit binary words on the chips, each such word containing two pattern data points of color information (each four bit part of a word, or byte, defining up to fifteen colors and thus any one of the five colors dealt with in the embodiment of the present invention described herein). The color data for each pattern is sequentially stored on, and sequentially accessed from, each chip.

Microprocessor

FIG. 4 illustrates microprocessor 200 in block diagram form, being comprised of an Intel 8080 microprocessor integrated circuit chip 221, an Intel 8224 clock generator integrated circuit chip 222, and an Intel 8228 system controller integrated circuit chip 223. These integrated circuit chips are well known and commercially available, and their connection as shown in FIG. 4 forms one of the most widely used microprocessors in the United States at present.

The address bus of FIG. 4 has 16 bits and serves to address external memory (PROM memory 202 of FIG.

3, containing the control program of FIGS. 8A-8D; RAM memory 203 of FIG. 3, forming the working memory of the microprocessor 200; and PROM pattern card 201 of FIG. 3 containing pattern information for multi-colored complex patterns) and input-output devices. The bidirectional data bus of FIG. 4 has 8 bits and flows data to and from external memory and input-output devices. The control bus of FIG. 4 provides control signals to external memory and to input-output devices. Otherwise shown in FIG. 4 are the power, control and timing signals for the particular Intel microprocessor described, which signals are well known to those skilled in the art.

Turning to FIG. 5, the block diagram of the architecture of the Intel 8080 microprocessor integrated circuit chip 221 of FIG. 4 is illustrated. Each block is labeled as to its function and number of bits, with the data lines $D_7$-$D_0$, the address $A_{15}$-$A_0$, and the power and timing and control signals for the chip also being shown.

For further information concerning the Intel microprocessor here disclosed, particularly as to its architecture, functioning, timing and instruction set, reference is made to *MICROPROCESSORS Technology, Architecture, and Applications*, by Daniel R. McGlynn, copyright 1976 by John Wiley & Sons, pp. 101–124; and to *How To Buy & Use Minicomputers & Microcomputers*, by William Barden, Jr., copyright 1976 by Howard W. Sams & Co., Inc., pp. 108-115. These references are incorporated into the present application by reference.

Control Program

Referring to FIGS. 8A-8D and FIG. 9, a control program and corresponding flow chart are illustrated for the embodiment of the present invention described herein.

The program begins at FIG. 8A and continues sequentially through FIG. 8D. As known to those skilled in the art, the far left column sets forth the sequential statements of the program, line by line. The next column to the right contains the assigned memory addresses. The next three columns to the right contain the object program instructions in machine language (hexadecimal). Continuing to the right, the source program in the Intel 8080 mnemonic symbol language is set forth, followed to the far right by comments further defining the program steps. The mnemonic symbols and a description of their operation in the Intel 8080 microprocessor is found in the two text portions referred to above.

Figure 19B:
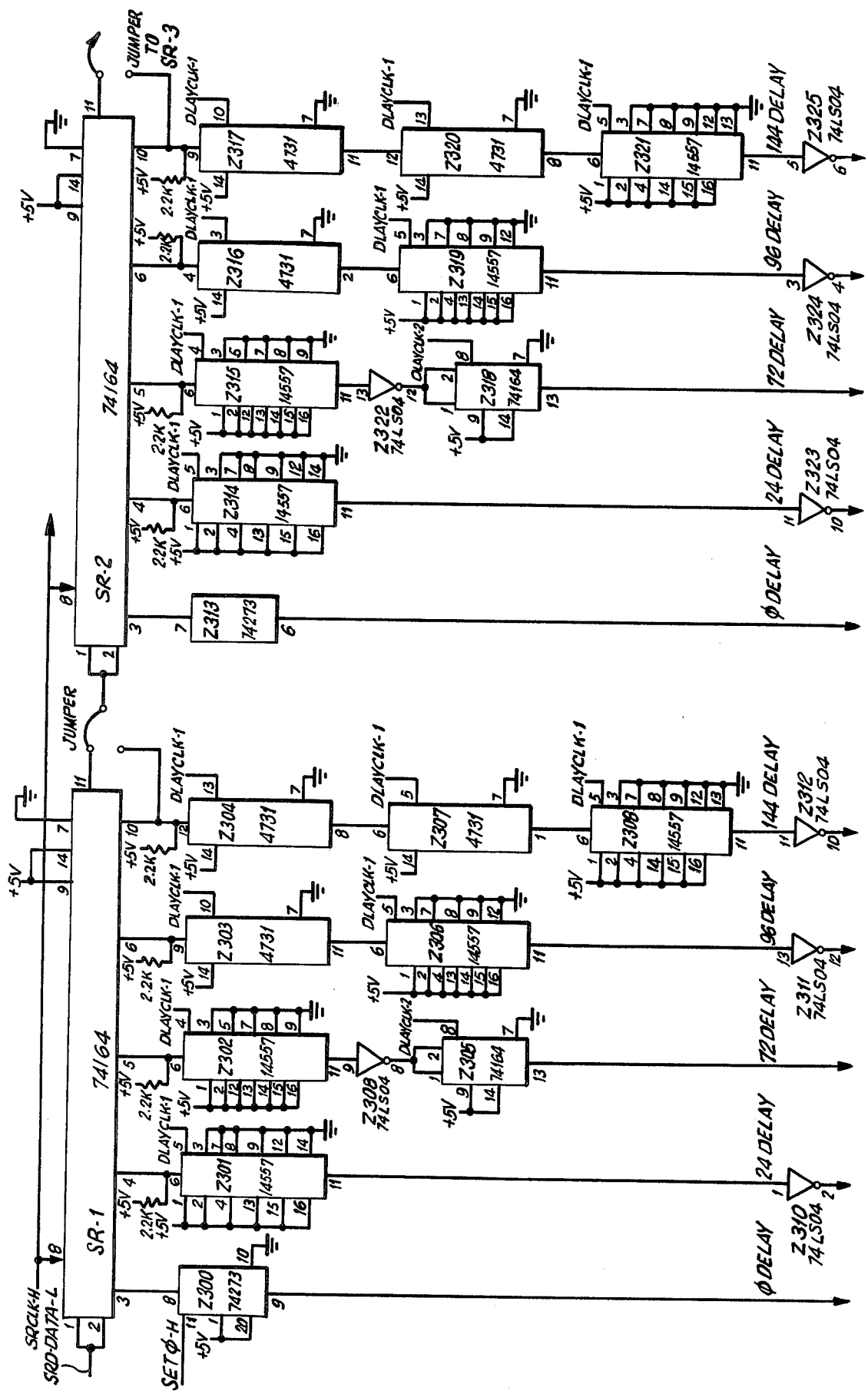

Moving through the program, statements 11 through 17 set up memory locations in RAM memory 203 (FIG. 3) for the information set forth in the comments at the far right. The program then disables the interrupts (statement 19), sets the stack pointer at the last RAM location plus 1 (statement 20), deenergizes all solenoid valves (statements 21-32), and clears all program variables (statements 33-36). All solenoid valves are cleared by clearing all shift register delay boards through the outputting of 48 words (96 bytes) of zeros to the shift register delay boards (FIG. 19A) and the shifting of the zeros through the shift register delays (FIG. 19B).

Figure 15:
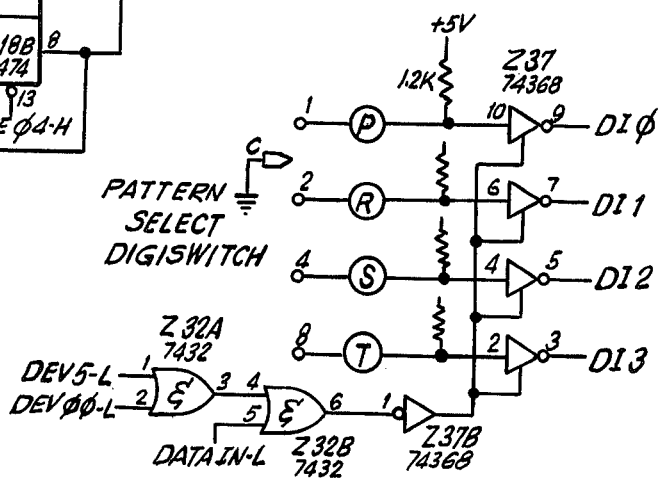
FIG. 15 illustrates logic switching means to select particular patterns to be utilized by the present invention.

Statement 37 obtains the identification of the pattern to be selected from PROM pattern card 201, the pattern to be selected being input from the pattern select digiswitch (hexadecimal) of FIG. 15. The pattern select digiswitch setting is converted to a pattern address at statement 44.

Statements 39, 41 and 43 respectively refer to three optional test programs for sequentially operating each yarn control assembly previously described (a "walking test pattern" to check for component failures), for generating a color test pattern at the dye pick-up rolls ("dye color test pattern"), and for energizing all yarn control assemblies for one color ("one color test pattern").

The pattern desired to be tufted is searched for and located at statement 45 and the width and length repeats are read from the located pattern at statements 47 and 49. Statements 46-54 serve to initialize program variables concerning pattern size, and PROM memory starting address for pattern data.

Figure 9:
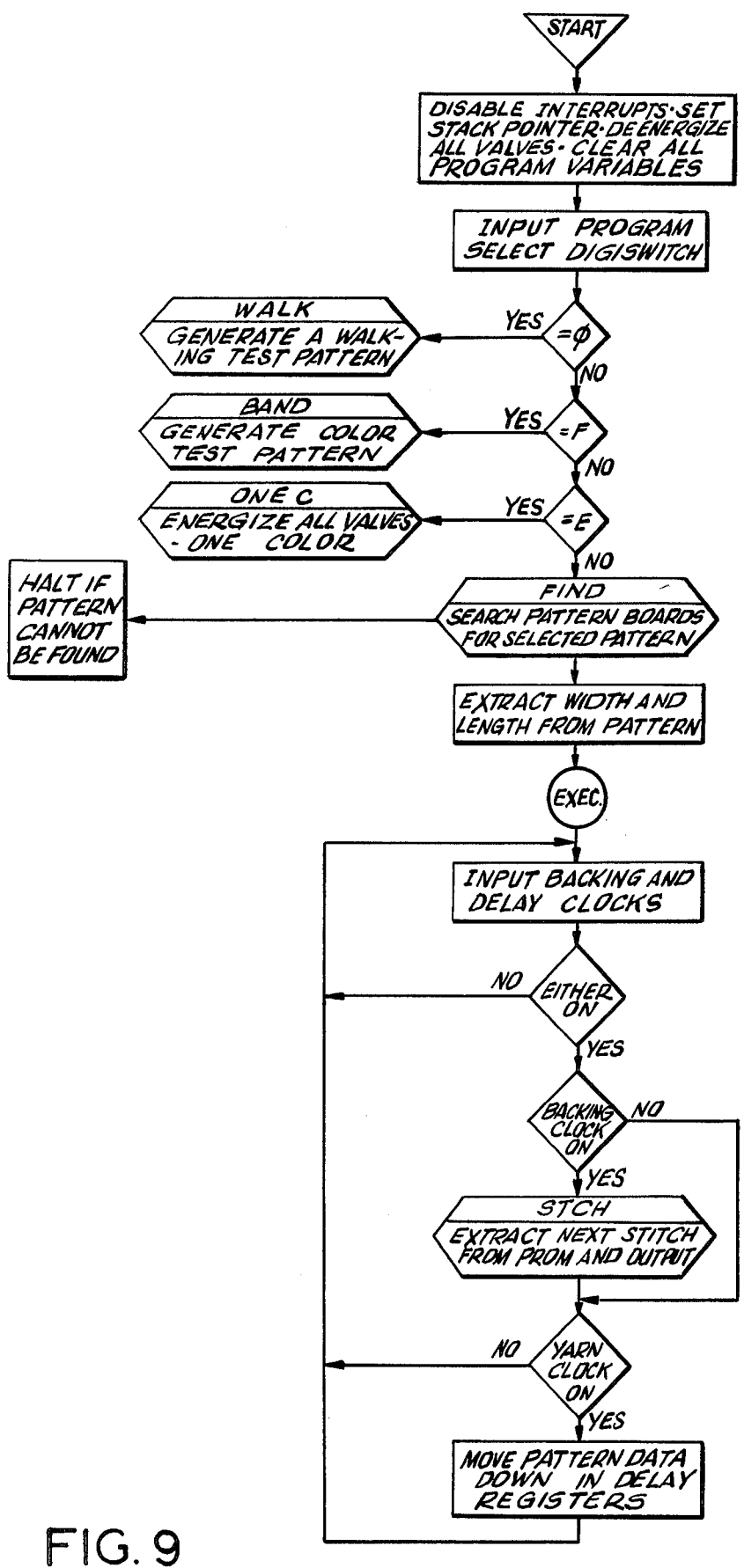
FIG. 9 is a flow chart for the control program of FIGS. 8A–8D.

Beginning at statement 55, and through statement 70, the backing and yarn clocks previously described are checked. If the clocks are not on, the program waits until at least one clock is available. As the flow chart of FIG. 9 illustrates, however, each backing clock results in the transfer of the next stitch of color information from the PROM pattern card 201 to the shift register delay boards (FIGS. 19A-19B), and each yarn clock results in the clocking of color information through the shift register delays of FIG. 19B.

In the control program, the input-output commands are OUT $\phi 3$ for outputting data to the shift register delay boards of FIG. 19A; IN $\phi 5$ for inputting the pattern select digiswitch setting; IN $\phi 4$ for inputting yarn and backing clock status; and OUT $\phi 4$ for generating set zero clocks and delay clocks.

Beginning at statement 71 are contained subroutines with explanatory comments for finding a particular pattern on the PROM pattern card 201 (statements 71-105), outputting a stitch of pattern data to the shift register delay boards and handling of width and length repeats (statements 107-140), and for carrying out the three test patterns referred to above (statements 141-181).

In particular, as to the locating of a particular pattern on the PROM card 201, the control program begins at memory location 4000 (hexadecimal) on the card and tests for a pattern preamble word 81 (hexadecimal) there and at each subsequent 256'th memory location until the desired pattern is found. Consecutively numbered patterns are found consecutively at memory location 4000 and each subsequent 256'th memory location thereafter. The particular pattern desired is determined by the pattern select digiswitch.

Locating Patterns On PROM Pattern Card

Referring to FIGS. 10A–10C, shown are the means of individually addressing each particular EPROM integrated circuit chip Z 101 to Z 116 on PROM pattern card 201 (FIG. 7), as well as finding particular pattern information within the individual chip addressed.

FIG. 10C illustrates the manner in which the voltage regulators previously referred to in FIG. 7 generate the regulated signals $V_{CC}$ (+5 volts), $V_{DD}$ (+12 volts), and $V_{BB}$ (−5 volts), which are in turn used in FIGS. 10A and 10B.

In FIG. 10B, address lines $A_{10}$ to $A_{13}$ from the microprocessor 200 are the input to decoding integrated circuit chip Z 120, and serve to address one of the sixteen EPROM chips Z 101 to Z 116 at the output of chip Z 120. Address lines A14, A15 and strobe MEMR from the microprocessor are input to decoding integrated circuit chip Z 119, and "Memory Address Jumper Wire" determines whichever one of four 16K blocks of memory is desired (one of four EPROM cards 201, for example, each containing approximately 16K of memory).

Referring to FIG. 10A, address lines A0 to A9 from the microprocessor 200 are the input to each of the sixteen chips Z 101 to Z 116, FIG. 10A representing each of the sixteen chips. The particular chip selected by the circuitry of FIG. 10B has a chip select $\overline{CS}$ signal input to it (FIG. 10A), and the particular pattern data address on lines A0 to A9 outputs the located pattern information on data lines D$\phi$-D7 to the microprocessor 200. Tri-state gates Z 117 and Z 118 have been previously referred to in the discussion of FIG. 7, and $\overline{G1}$ (FIG. 10B) is a combined timing and address signal to drive these gates.

The numbers next to the various input and output lines of the integrated circuit chips are, in this as well as other figures of the present application, pin numbers of the chips to show the appropriate connections.

Interface Circuitry (Microprocessor Timing)

Figure 11:
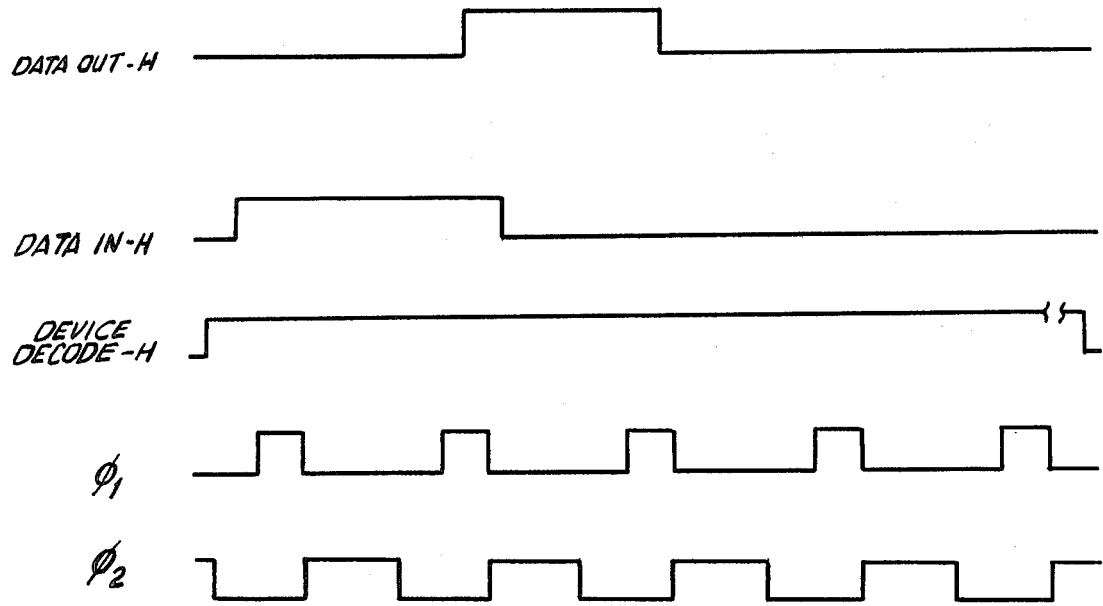
FIG. 11 illustrates a timing diagram for the microprocessor of the present invention.

FIG. 11 illustrates the input timing and output timing of the microprocessor. DATAIN-H is the "data in" signal, a strobe signal to put external data from a device onto the data lines so it can be input to the microprocessor. DEVICE DECODE-H decodes a device address on the address lines. $\phi_1$ and $\phi_2$ are oscillator clocks. DATAOUT-H strobes data to a device during an output command.

The "devices" referred to herein with regard to the timing signals include the inputting of the pattern select digiswitch of FIG. 15 (IN $\phi$5 command), the inputting of the yarn and backing clock status (IN $\phi$4 command), the outputting of pattern data to the shift register delay boards (OUT $\phi$3 command) and the outputting of control pulses (OUT $\phi$4 command, to generate set zero clocks and delay clocks).

Interface Circuitry (Device Decoding, Control Pulse Generation)

Figure 12A:
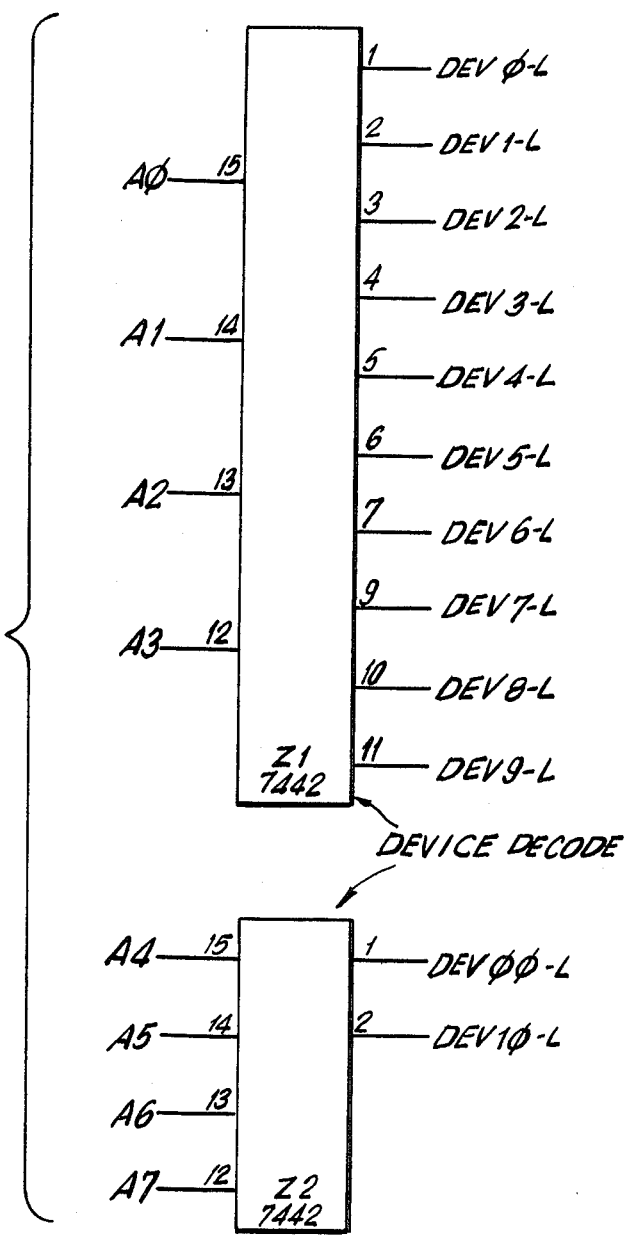
FIGS. 12A–12B illustrate logic decoding and control pulse generation means of the present invention.

FIG. 12A illustrates decoding means utilizing two integrated circuit chips Z 1 and Z 2, both of which are 7442 type decoding chips. Here, and throughout the remainder of the description of circuitry utilized in the present invention, the pin connections of the integrated circuit chips are shown and the standard type numbers of the integrated circuit chips are placed on or directly adjacent to the chips. The integrated circuit chips all are available from Texas Instruments and/or numerous other integrated circuit manufacturers. The identification Z where used refers to an integrated circuit chip.

Address connections A$\phi$ to A7 from the microprocessor to the decoding chips are shown, and the output lines from the chips address separate devices (again, the devices being the pattern select digiswitch, the yarn and backing clock status, the pattern data output, and the output of control pulses). The function of the decoding logic of FIG. 12A is to select a particular device for the microprocessor to communicate with by input-output commands.

Figure 12B:
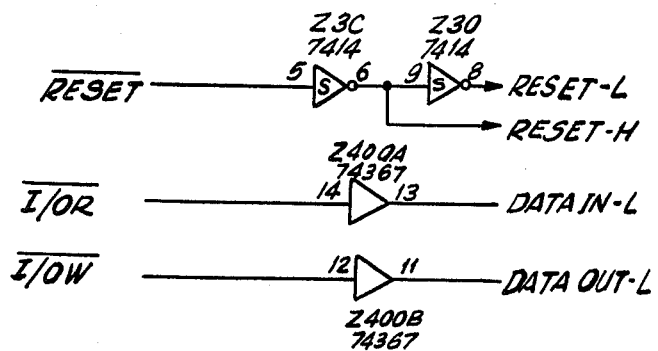

Referring to FIG. 12B, logic is shown to derive control pulses used elsewhere in the interface circuitry. The $\overline{RESET}$ signal is used to derive the RESET-L and RESET-H signals for resetting various circuits in the system, Z 3C and Z 3D being inverters. The DATAIN-L signal, derived from the $\overline{I/OR}$ signal and buffer Z 400A, strobes data from a device to the microprocessor during an IN $\phi$5 or IN $\phi$4 command. The DATAOUT-L signal, derived from the $\overline{I/OW}$ signal and buffer Z 400B, strobes data from the microprocessor to a device during an OUT $\phi$3 or OUT $\phi$4 command.

Interface Circuitry (Backing and Yarn Control Signals Generation)

Referring to FIG. 13A, backing clock pulse generator 137 (FIGS. 1, 3) previously referred to is a two phase clock generator having channel A (CHA) and channel B (CHB) connectors in turn connected to A and B connectors at the microprocessor. A two phase clock generator is used to differentiate forward and reverse motion of the drive roll 136 shaft that the pulse generator 137 is connected to, thus to sense forward and reverse motions of the carpet backing (slight reverse motions of the carpet backing may occur during machine operation). A positive transition of channel A with channel B at low level indicates backing motion in the forward direction. A positive transition of channel A with channel B at high level indicates backing motion in the reverse direction. The channel A output is integrated and passed to inverting Schmitt trigger Z 13A to derive signals BCHA-L and BCHA-H (Z 13E being an inverter). Signals BCHB-L and BCHB-H are similarly derived from the channel B output in the same manner, using inverting Schmitt trigger 13B and inverter 13F.

Referring to FIG. 13B, yarn clock pulse generator 132 (FIGS. 1, 3) previously referred to also is an identical two phase clock generator to detect forward and reverse motion of the yarn (slight reverse motions of the yarn may occur during machine operation), as sensed through the drive roll 131 shaft to which the pulse generator 132 is connected. Pulse generator 132 has channel A (CHA) and channel B (CHB) connectors in turn connected to C and D connectors at the microprocessor. In the same manner as described in relation to FIG. 13A, signals YCHA-H, YCHA-L, YCHB-H and YCHB-L are derived. Z 13C and Z 13D are inverting Schmitt triggers, and Z 3A and Z 3B are inverters. Connectors H and D on the pulse generators are respectively connected to +5 volts at the microprocessor (connector E) for pulse generator power, and to ground (connector F).

The above derived backing and yarn clocks suffer from "jitter" due to machine vibrational effects, since the pulse generators 132 and 137 are of a high resolution. The effects of "jitter" on these clocks is shown in FIG. 13E (CHA, CHB), and the logic circuitry of FIGS. 13C and 13D serves to electronically eliminate the "jitter" to provide clean signals as also shown in FIG. 13E (CLKA, CLKB).

In FIG. 13C, the BCHA-H and BCHB-H signals are "added" through Z 12A to flip-flop Z 11A, the BCHA-L and BCHB-L signals are "anded" through Z 12B to flip-flop Z 11A, and flip-flop Z 11A outputs signal BCLKB-L. Signal BCLKA-H is derived from flip-flop Z 11B by the "anding" of signals BCHA-H and BCHB-L through Z 12C to flip-flop Z 11B, and the "anding" of signals BCHA-L and BCHB-H through Z 12D to flip-flop Z 11B. In FIG. 13D, signal YCLKB-L is derived from flip-flop Z 9A and signal YCLKA-H is derived from flip-flop Z 9B in the same manner as described in FIG. 13C. All the input signals to FIG. 13C are output signals from FIG. 13A, and all the input signals to FIG. 13D are output signals from FIG. 13B. In FIG. 13D, Z 10A, Z 10B, Z 10C and Z 10D are all "anding" gates. The backing and yarn output signals of FIGS. 13C and 13D are all independent of speed, and free of "jitter" (FIG. 13E, CLKA and CLKB), since the machine vibration has no effect once flip-flops Z 11A, Z 11B, Z 9A and Z 9B are set. These output signals from FIGS. 13C and 13D are then input to FIGS. 13F and 13G as shown.

In FIG. 13F, signal BCLKA-H is input to Z 26A, a one-shot circuit firing on a positive transition of backing clock A. The output of Z 26A is "anded" with signal BCLKB-H by Z 29A to provide backing clock signal BUP-L. Signal BDN-L is derived in FIG. 13F by inputting signal BCLKA-L to Z 26B, a one-shot circuit firing on a negative transition of backing clock A. The output of Z 26B is "anded" with signal BCLKB-H by Z 29B to provide backing clock signal BDN-L. In FIG. 13G, yarn clock signals YUP-L and YDN-L are similarly derived respectively through one-shot circuits Z 28A and Z 28B, "anding" gates Z 29C and Z 29D, and input signals YCLKA-H, YCLKB-H, YCLKA-L and YCLKB-H. Z 28A fires on a positive transition of yarn clock A, and Z 28B fires on a negative transition of yarn clock A.

Backing clock signals BUP-L and BDN-L (FIG. 13F outputs) are respectively backing up and backing down clocks, and yarn clock signals YUP-L and YDN-L (FIG. 13G outputs) are respectively yarn up and yarn down clocks. Signal BUP-L is a backing clock provided by forward motion of the backing, and signal BDN-L is a backing clock provided by reverse motion of the backing. Similarly, signal YUP-L is a yarn clock signal provided by forward motion of the yarn, and signal YDN-L is a yarn clock signal provided by reverse motion of the yarn. Since both the backing and yarn may undergo slight reverse motions during operation of the system, and since, as previously described, the backing and yarn forward displacements control outputting of pattern data to the shift register delay boards and clocking of that data to the yarn control assemblies over the spaced dye baths, it is essential that the exact backing and yarn net forward displacements (a total function of forward motion and any reverse motion) be sensed. Otherwise, inaccurate dyeing at the dye baths and pattern distortion at the tufting machine will occur.

Figure 14A:
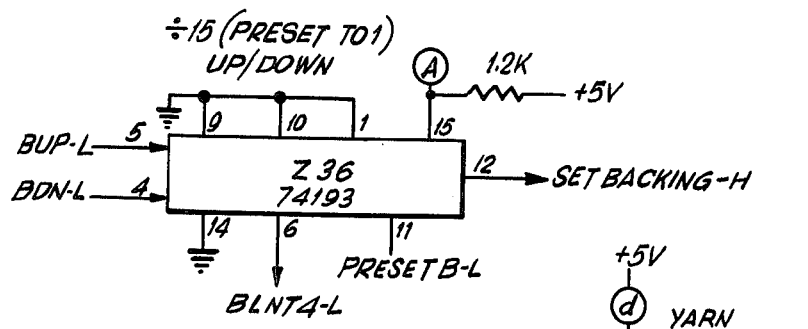
FIGS. 14A–14C illustrate logic means to generate yarn and backing control signals to the microprocessor to be utilized by the present invention.

Referring to FIG. 14A, signals BUP-L and BDN-L are input to up/down counter Z 36. Forward motion backing clocks BIP-L count the counter up, and reverse motion backing clocks BDN-L count the counter down. The counter is preset to 1, and when it overflows (15 net up pulses), an output pulse SET BACKING-H is generated. In the embodiment of the invention herein described, each 3/16 inch of backing net forward displacement provides an output pulse SET BACKING-H. Counter Z 36 also provides output pulse BCNT4-L (used in FIG. 18B), and input pulse PRESET B-L from FIG. 14C presets the counter.

Figure 14B:
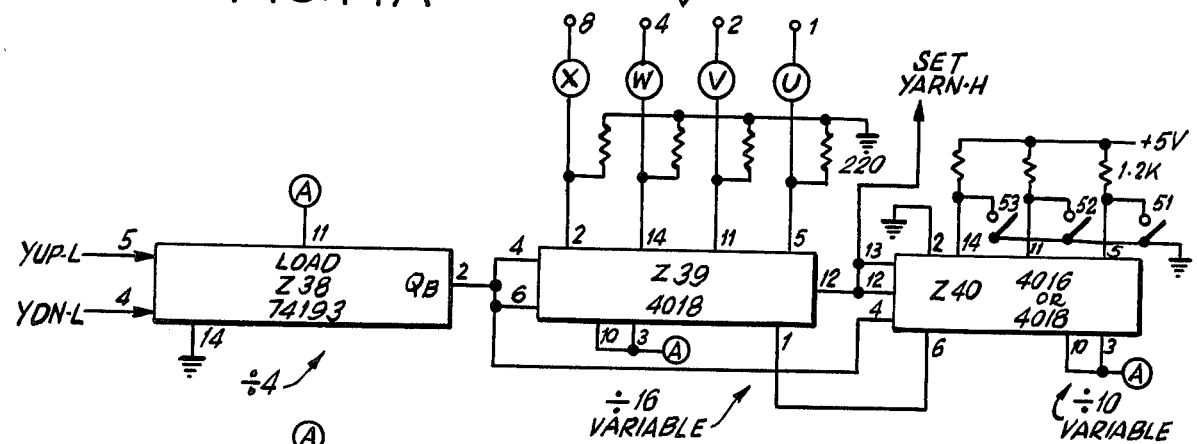

Referring to FIG. 14B, signals YUP-L and YDN-L are similarly input to up/down counter Z 38. Forward motion yarn clocks YUP-L count the counter up, and reverse motion yarn clocks YDN-L count the counter down. Counters Z 38, Z 39 and Z 40 overflow (representing ½ inch of yarn net forward displacement) to generate signal SET YARN-H. Variable dividers (counters) Z 39 and Z 40, through setting of the "yarn digiswitch", compensate for the gear ratio between yarn drive roll 131 and yarn clock pulse generator 132, so that the adjoining predetermined sections where dyes are applied to the individual yarn ends do not overlap or have a separation between them, but rather line up with accuracy. The yarn digiswitch provides this "fine tuning" adjustment of the yarn distance between pulses.

Figure 14C:
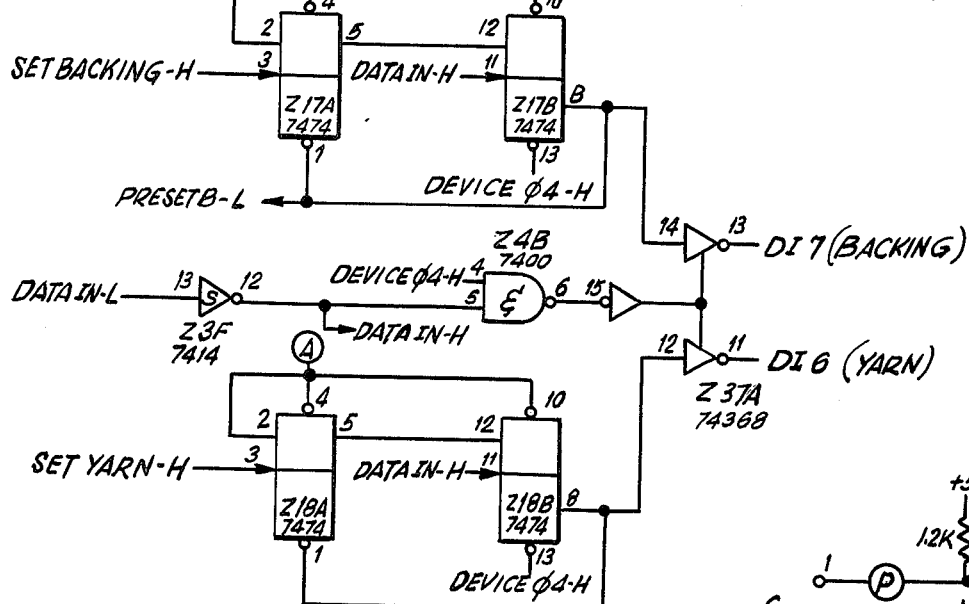

Referring to FIG. 14C, SET BACKING-H output from FIG. 14A is input to flip-flop Z 17A, DATAIN-H is input to flip-flop Z 17B (DATAIN-H being derived from DATAIN-L as shown, through inverter Z 3F), Z 17A and Z 17B are connected together as shown, and an output of Z 17B is connected to one side of tri-state gate Z 37A. Z 17A and Z 17B also output PRESET B-L to the up/down counter Z 36 of FIG. 14A. DATAIN-H "anded" with DEVICE$\phi$-4 (FIG. 16G) by Z 4B generates the strobe input to tri-state gate Z 37A. SET YARN-H output from FIG. 14B is input to flip-flop Z 18A, connected to flip-flop Z 18B as shown, and signal DATAIN-H is also input to flip-flop Z 18B. The output of Z 18B is connected to the remaining side of tri-state gate Z 37. Signal DEVICE$\phi$4-H from FIG. 16G (resulting from an "anding" by Z 31A of signals DEV$\phi\phi$-L and DEV4-L from FIG. 12A, and the inverting of the "anded" signal by Z 23A) inputs to both flip-flops 17B and 18B and frees the flip-flops to allow the DATAIN-H signal to operate on an IN $\phi$4 command, which in turn outputs flip-flop Z 17A to Z 17B, and flip-flop Z 18A to flip-flop Z 18B. By means of this logic, SET BACKING-H and SET YARN-H pulses cannot be missed (ignored by the system), which might otherwise occur because of the inherent non-synchronization of the microprocessor and the yarn-backing clocks. A SET BACKING-H pulse must occur before DATAIN-H and DEVICE$\phi$4-H pulses in order to obtain a backing status signal at DI 7; and a SET YARN-H pulse must occur before DATAIN-H and DEVICE$\phi$4-H pulses in order to obtain a yarn status signal at DI 6. When the backing signal SET BACKING-H is received at FIG. 14C (representing 3/16 of an inch backing net forward displacement), and the DATAIN-L signal is received from the microprocessor, backing status signal DI 7 is then input to the microprocessor to obtain a new stitch of pattern data for the shift register delay boards; similarly, when the yarn signal SET YARN-H is received at FIG. 14C (representing ½ of an inch yarn net forward displacement), and the DATAIN-L signal is received from the microprocessor, the yarn status signal DI 6 is then input to the microprocessor to clock pattern data to the yarn control assemblies.

Interface Circuitry (Pattern Select Digiswitch)

Referring to FIG. 15, means are shown to select particular individual patterns on PROM pattern card 201. The number of the particular pattern desired is dialed on the hexadecimal "pattern select digiswitch". Signals DEV 5-L and DEV $\phi\phi$-L from FIG. 12 are "added" by Z 32A, the output of which is added with DATAIN-L by Z 32B to provide a strobe output to tri-state gate Z 37B. The digiswitch lines P, R, S, and T are also input to tri-state gate Z 37, and a binary output from the gate is provided on input data lines DI $\phi$, DI 1, DI 2, and DI 3 to the microprocessor on an IN $\phi$5 command. This binary output identifies the desired pattern.

Interface Circuitry (Control Logic to Transfer and Decode Pattern Data and Interchange Colors)

FIGS. 16A-16I and FIG. 17 are next considered together, because of the interrelationship of their signals and functioning.

Figure 16A:
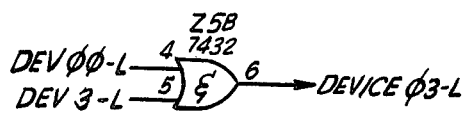
FIGS. 16A–16I illustrate logic means to generate control signals utilized by the present invention in FIGS. 17, 19C–19D, and elsewhere.

Referring first to FIG. 16A, signals DEV $\phi\phi$-L and DEV 3-L (from FIG. 12A) and "anded" by Z 5B to generate signal DEVICE$\phi$3-L.

Figure 16B:
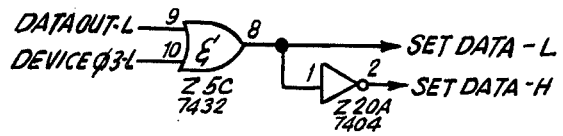

In FIG. 16B, signals DATAOUT-L (FIG. 12B) and DEVICE$\phi$3-L are "anded" by Z 5C to generate SET DATA-L and SET DATA-H signals, Z 20A being an inverter.

Figure 16C:
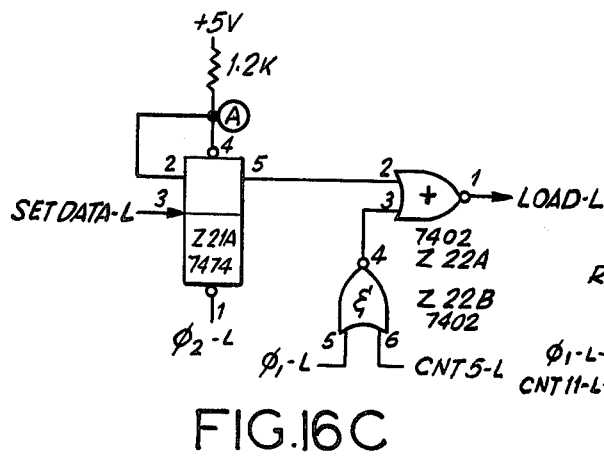

In FIG. 16C, signals SET DATA-L and $\phi_2$-L (FIG. 16E) are input to flip-flop Z 21A. Signals $\phi_1$-L (FIG. 16E) and CNT5-L (FIG. 16F) are "anded" by Z 22B, the output of which is "ored" with the output of flip-flop Z 21A to provide signal LOAD-L.

Figure 16D:
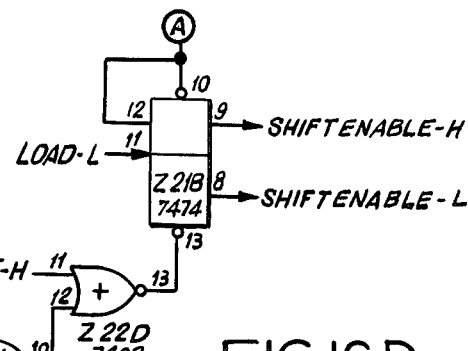

In FIG. 16D, signals $\phi_1$-L and CNT 11-L (FIG. 16F) are "anded" by Z 22C to provide an output "ored" with RESET-H (FIG. 12B) by Z 22D, to in turn provide an input to flip-flop Z 21B. Signal LOAD-L is an input to Z 21B, which provides output signals SHIFTENABLE-H and SHIFTENABLE-L.

Figure 16E:
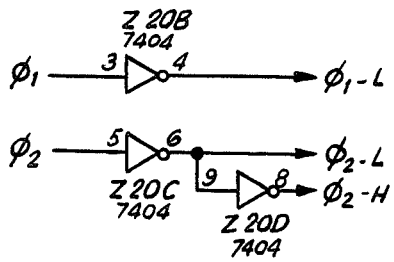

In FIG. 16E, $\phi_1$ passes to buffer driver inverter Z 20B to provide signal $\phi$1-L. $\phi_2$ passes to buffer driver inverter Z 20C to provide signals $\phi_2$-L and $\phi_2$-H, Z 20D being an inverter.

Figure 16F:
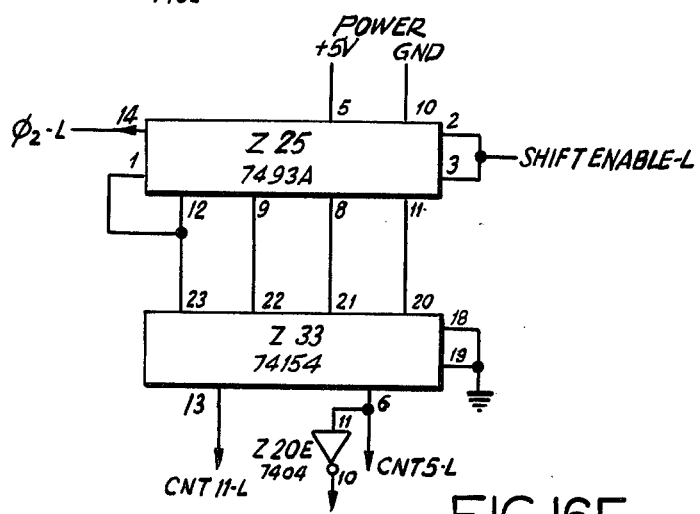

In FIG. 16F, Z 25 is a shift pulse binary counter, connected to Z 33, a four line to sixteen line counter decoder (hexadecimal), as shown. SHIFTENABLE-L is an input to Z 25 to enable counting after a LOAD-L pulse, and the outputs of Z 33 are CNT 11-L, CNT 5-L and CNT 5-H, Z 20E being an inverter. CNT 11-L is active on count 11, and CNT 5 is active on count 5.

Figure 16G:
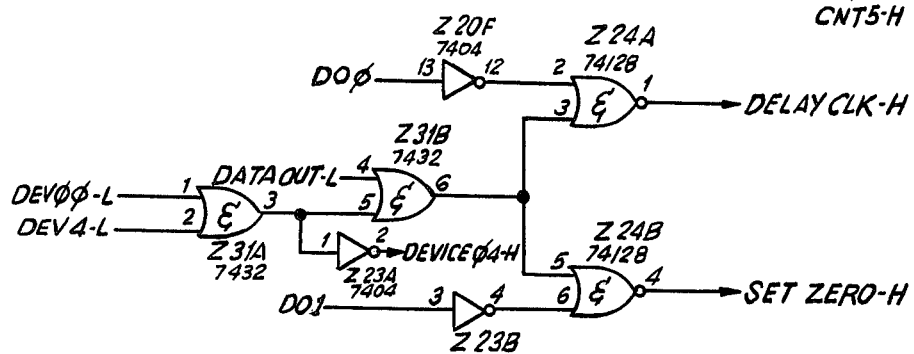

In FIG. 16G, signals DEV $\phi\phi$-L and DEV 4-L (FIG. 12A) are "anded" by Z 31A, the output of which is "anded" with DATAOUT-L (FIG. 12) by Z 31B. The output of Z 31A also is inverted by Z 23A to provide signal DEVICE$\phi$4-H previously described. Signal DO $\phi$ (information signal from the microprocessor) is inverted by Z 20F, and is "anded" with the output of Z 31B by Z 24A to provide signal DELAY CLK-H. Signal DO 1 (information signal from the microprocessor) is inverted by Z 23B, and is "anded" with the output of Z 31B by Z 24B to provide signal SET ZERO-H.

Figure 16H:
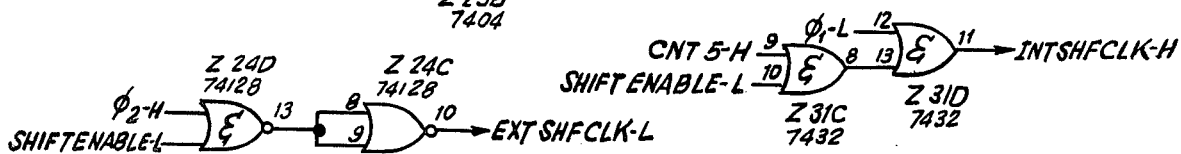

In FIG. 16H, signals $\phi_2$-H and SHIFTENABLE-L are "anded" by Z 24D, the output of which inputs to inverter buffer driver Z 24C to provide signal EXTSHFCLK-L.

Figure 16I:
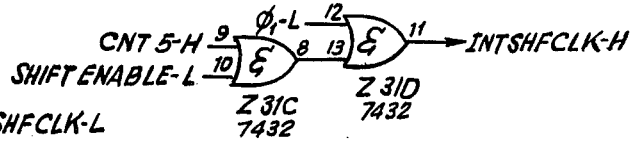

In FIG. 16I, signals CNT5-H and SHIFTENABLE-L are "anded" by Z 31C, the output of which is "anded" with signal $\phi_1$-L by Z 31D to provide signal INTSHFCLK-H.

Figure 17:
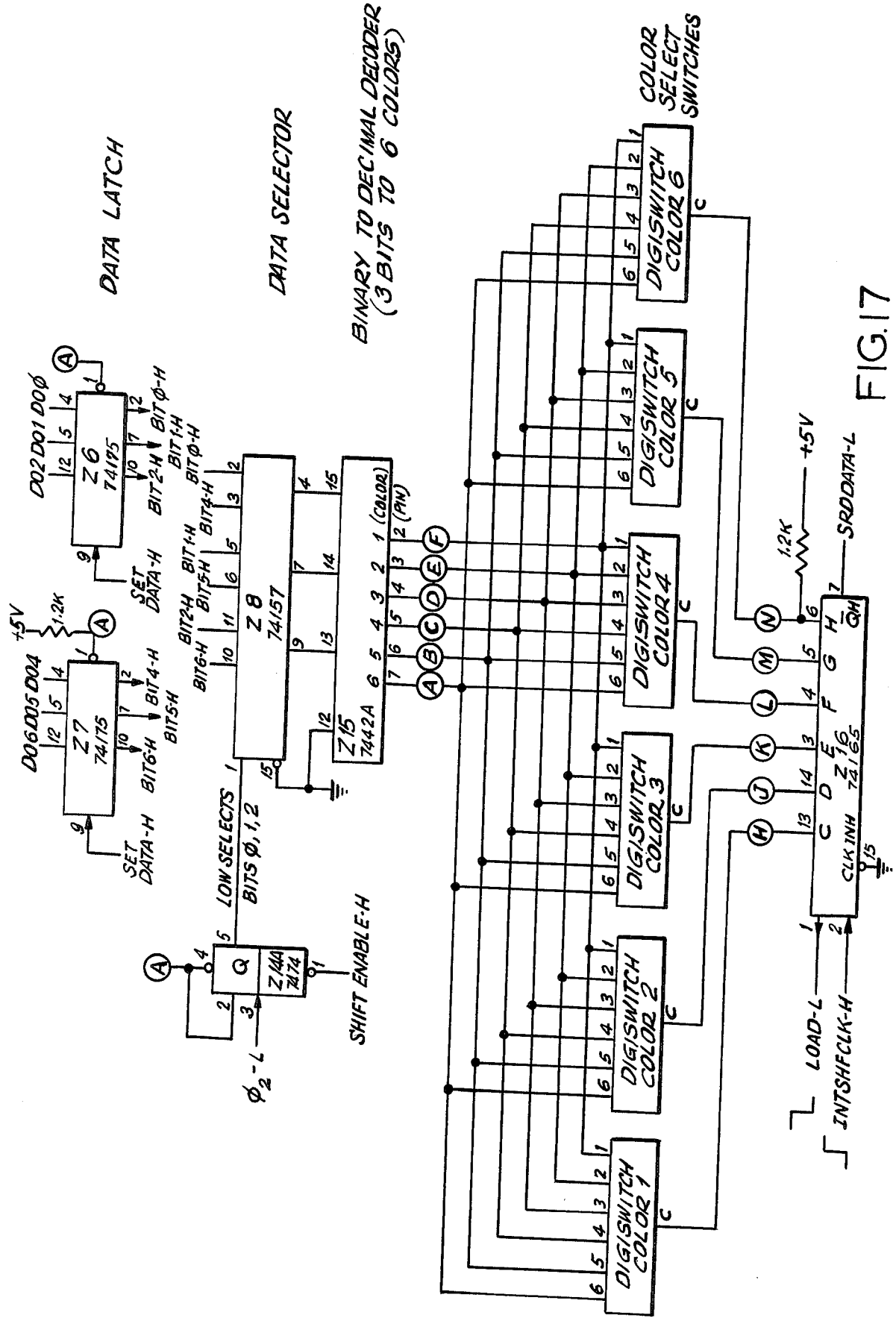
FIG. 17 illustrates logic means of the present invention to shift and decode pattern data from EPROM chips through to the shift registers and shift register delays, including logic switching means to shift the colors about within the particular pattern to be tufted.

Now referring to FIG. 17, Z 7 and Z 6 are each four bit data latches. Data lines DO 6, DO 5, and DO 4 from the microprocessor input to latch Z 7 with a "byte" of color pattern data, and data lines DO 2, DO 1, and DO $\phi$ from the microprocessor input to latch Z 6 with a further "byte" of color pattern data. The two "bytes" of color pattern data (two pattern data points) on lines DO $\phi$, DO1, DO 2, DO 4, DO 5 and DO 6 are one word of memory from PROM pattern card 201, and are output simultaneously to latches Z 6 and Z 7 on an OUT $\phi$3 command. The words sequentially outputted from PROM pattern card 201 on each OUT $\phi$3 command contain sequentially scanned pattern data for the first stitch and each succeeding stitch of the pattern to be tufted, with the two "bytes" in each word also being in the proper sequential fashion (DO $\phi$, DO 1, DO 2 preceding DO 4, DO 5 and DO 6). The SET DATA-H signal (FIG. 16B) inputs to each of latches Z 7, Z 6 to clock in the data. The output of latch Z 7 is BIT6-H, BIT5-H and BIT4-H, binary signals defining one of the five dye colors of the embodiment of the invention described herein; similarly, the output of latch Z 6 is BIT2-H, BIT1-H and BIT$\phi$-H, binary signals also defining one of the five dye colors.

In FIG. 17, Z 8 is a three pole, double throw switch, which alternately inputs the three Z 6 outputs (in parallel) and the three Z 7 outputs (in parallel) through to Z 15, a binary to decimal decoder which decodes three binary bits to one of six dye colors. Z 15 only has one output line active at any given time, representing one of the six dye colors (only five dye colors are used in the embodiment of the invention described herein). When pin 1 of Z 8 is low, the Z 6 output data goes to Z 15; if pin 1 of Z 8 is high, the Z 7 output data goes to Z 15. Pin 1 of Z 8 is controlled by the output of flip-flop Z 14A, which has signals $\phi_2$-L (FIG. 16E) and SHIFTENABLE-H (FIG. 16D) as inputs. When outputting data from PROM card 201, pin 1 of Z 8 is set low initially by flip-flop Z 14A so that Z 6 data precedes Z 7 data to Z 15.

In FIG. 17, a one bit decimal output of decoder Z 15 is sent to all "color select switches" (decimal digiswitches), each of which is discretely set from the others to one of the five dye bath colors (the Digiswitch Color 6 being inactive). One of the five switches because of its setting with a particular dye bath color will pass one bit of pattern information representing that color through to shift register Z 16; the other four switches will pass no information. As an example, if binary 4 is latched into Z 6 and the number 4 line out of Z 15 is accordingly active, the color digiswitch set at number 4 will allow the active line to be switched through to its corresponding bit position in the input line of the parallel to serial shift register Z 16.

Color pattern information for a stitch to be dyed and tufted is input to latches Z 6 and Z 7, one PROM word at a time on each OUT $\phi$3 command. The first Z 6 "byte" contains the first color point of the stitch, the first Z 7 "byte" contains the second color point of the stitch, the second Z 6 "byte" contains the third color point of the stitch, the second Z 7 "byte" contains the fourth color point of the stitch, and so forth. Z 6 and Z 7 color information alternately passes to Z 8, is decoded by Z 15, and passes through its associated (same color) digiswitch to Z 16.

In FIG. 17, a bit of color information originally from Z 6 enters Z 16 and is clocked out to the shift register delay boards (FIGS. 19A-19B) before a bit of color information originally from Z 7 enters Z 16. The color information originally from Z 7 then enters and is clocked out of Z 16. Parallel to serial shift register Z 16 is controlled by signals LOAD-L (FIG. 16C) and INTSHFCLK-H (FIG. 16I), and operates on a single OUT $\phi$3 command to input and output first the Z 6 data and then the Z 7 data. Each LOAD-L pulse loads either Z 6 or Z 7 data into Z 16 in parallel fashion, and each INTSHFCLK-h pulse outputs either Z 6 or Z 7 data serially from Z 16 (SRDDATA-L) to the shift register delay boards of FIGS. 19A-19B. After LOAD-L pulse occurs to load Z 6 data, flip-flop Z 14A changes state to control the alternation of Z 8 to Z 7 data. After each instance of the shifting of both Z 6 and Z 7 data out of Z 16, the operation ceases to await the next OUT $\phi$3 command with a further word of data from PROM card 201. The output of Z 6 data from Z 16 will be a one bit and the rest zero bits, the position of the one bit varying in each Z 6 serial output depending upon the dye color it represents; the output of Z 7 data will be likewise.

Now referring back to FIG. 16 in conjunction with FIG. 17, it can be seen that Z 5B (FIG. 16A) is a device decoder for an OUT $\phi 3$ command to transfer a word (two bytes) of pattern data to latches Z 6 and Z 7 of FIG. 17. Z 21A (FIG. 16C) generates the LOAD-L pulse for shift register Z 16 (FIG. 17) for data originating in the Z 6 latch, and Z 22B (FIG. 16C) generates the LOAD-L pulse for shift register Z 16 for data originating in the Z 7 latch. Z 21B (FIG. 16D) enables Z 16 and the shift register delay boards (FIGS. 19A–19D) commencing with an OUT $\phi 3$ command and ending when twelve bits (2 six bit bytes) are transferred from Z 16 to the shift register delay boards. Z 22D (FIG. 16D) resets Z 21B whenever the reset switch is operated or a twelve bit data shift from Z 16 has concluded. Z 22C (FIG. 16D), combined with Z 25 and Z 33 (FIG. 16F), reset Z 21B after twelve shift pulses to halt data transmission until the next OUT $\phi 3$ command. Z 31A is a device decoder for an OUT $\phi 4$ command to generate set zero clocks and delay clocks. Z 24A generates a DELAY CLK-H pulse to clock the shift register delay boards (FIGS. 19A–19D) if DO $\phi$ is on when an OUT $\phi 4$ command occurs. Z 24B generates a SET ZERO-H pulse if DO 1 is on when an OUT $\phi 4$ command occurs. DO $\phi$ is on when a yarn clock has occurred, and DO 1 is on when the shift register delay boards (FIGS. 19A–19B) have been filled with a stitch of data. Z 24D generates EXTSHFCLK-L pulses to the shift register delay boards whenever Z 21B is set. Z 31C disables the INTSHFCLK pulse on count 5 of the shift pulse counter Z 25, and Z 31D generates INTSHFCLK pulses when Z 21B is set, except for count 5 of Z 25.

Further functions of the signals generated in FIGS. 16A–16I will become apparent in the discussion of FIGS. 19A–19D.

By the operation of the color digiswitches of FIG. 17, the colors may be interchanged within a given pattern being tufted. FIG. 17 shows six digiswitches for six colors; in the five-color embodiment of the present invention herein described, Digiswitch Color No. 6 is inactive, and data for color six is shifted to an unused bit position of Z 16. Each of the other five digiswitches is discretely set from each other digiswitch, and by varying the settings it can be seen that color data normally channeled to one entry position on Z 16 will be channeled to a different entry position on Z 16 depending on the digiswitch settings. As will be seen hereinafter in discussing FIGS. 19A–19B, the entry positions of color data into Z 16 control which of the five dye baths is selected for each point of color information. Assuming as an example that binary 3 is latched into Z 6, a single line of Z 15 is active to all number 3 positions of all digiswitches. One particular digiswitch will be set at number 3, and will allow the data from Z 15 through to Z 16 to the entry position on Z 16 associated with that particular digiswitch. If, however, each digiswitch is discretely set to a different setting, the data from Z 15 will go through to a different entry position on Z 16. Applying this to a carpet floral pattern to be tufted with a blue background and green leaves (two colors), for example, the digiswitch for dye bath 30 (Digiswitch Color No. 1) may be set at position 1 to obtain the blue background, and the digiswitch for dye bath 50 (Digiswitch Color No. 2) may be set at position 2 to dye the leaves green. However, if these two switch positions are interchanged, the background is dyed green by dye bath 50 and the leaves are dyed blue by the dye bath 30. With five dye baths for a five-colored pattern, the five digiswitches in use (Digiswitch Color No. 3 for dye bath 70; Digiswitch Color No. 4 for dye bath 90; and Digiswitch Color No. 5 for dye bath 110), there are one hundred and twenty color combinations for the pattern available through different digiswitch settings. As previously noted, there are great design and manufacturing advantages in being able to interchange colors within a given pattern.

Interface Circuitry (Starting and/or Stopping Machine)

Means are provided in the circuitry of FIG. 18 to compensate for low yarn speed upon starting, stopping or "jogging" the machine. During slow yarn speeds, if yarn ends are held too long on a dye pick-up roll, too much dye soaks into the yarn to give unintended visual color variation and "wicking" of one color along a yarn end into an adjoining color.

Figure 18A:
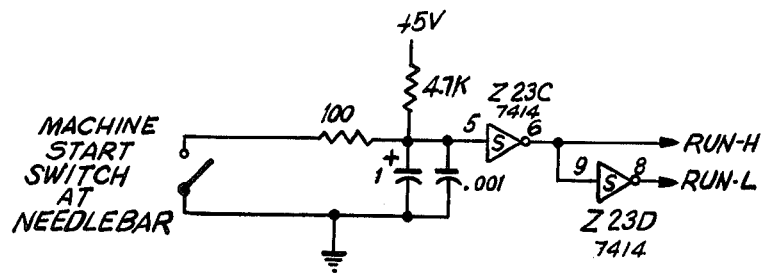
FIGS. 18A–18C illustrate logic means to compensate for low yarn speed upon starting and/or stopping of the machine.

Referring to FIG. 18A, the operation of the "machine start switch at needle bar" generates signals RUN-H and RUN-L through the integrating network, Schmitt trigger Z 23C, and inverter Z 23D. Signals RUN-H and RUN-L tell when the machine is running or stopped, and their transitions show when the machine is being started or being stopped. These signals remain inactive while jogging.

Figure 18B:
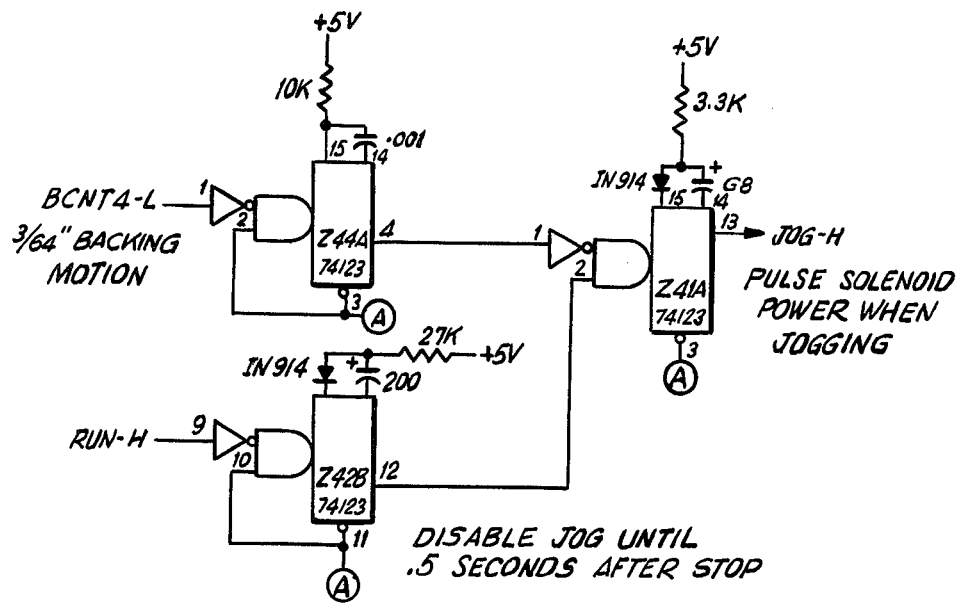

Referring to FIG. 18B, signal BCNT4-L from up/down counter Z 36 (FIG. 14A), occurring for each approximate 3/64 of an inch net forward backing displacement, is input to one-shot circuit Z 44A, and signal RUN-H is input to one-shot circuit Z 42B. Z 44A and Z 42B both input to one-shot circuit Z 41A, which outputs signal JOG-H. "Jogging", or intermittent start and stop of the machine, is implemented for example when a yarn end breaks, and occurs through tapping of a jogging switch. Z 41A pulses the solenoid power to the yarn control assemblies when jogging, so that yarn is not held too long on the dye pick-up rolls for the reasons described. Z 42B disables the JOG-H signal for a short period of time during and after stopping the machine, stopping of the machine being handled in FIG. 18C.

Figure 18C:
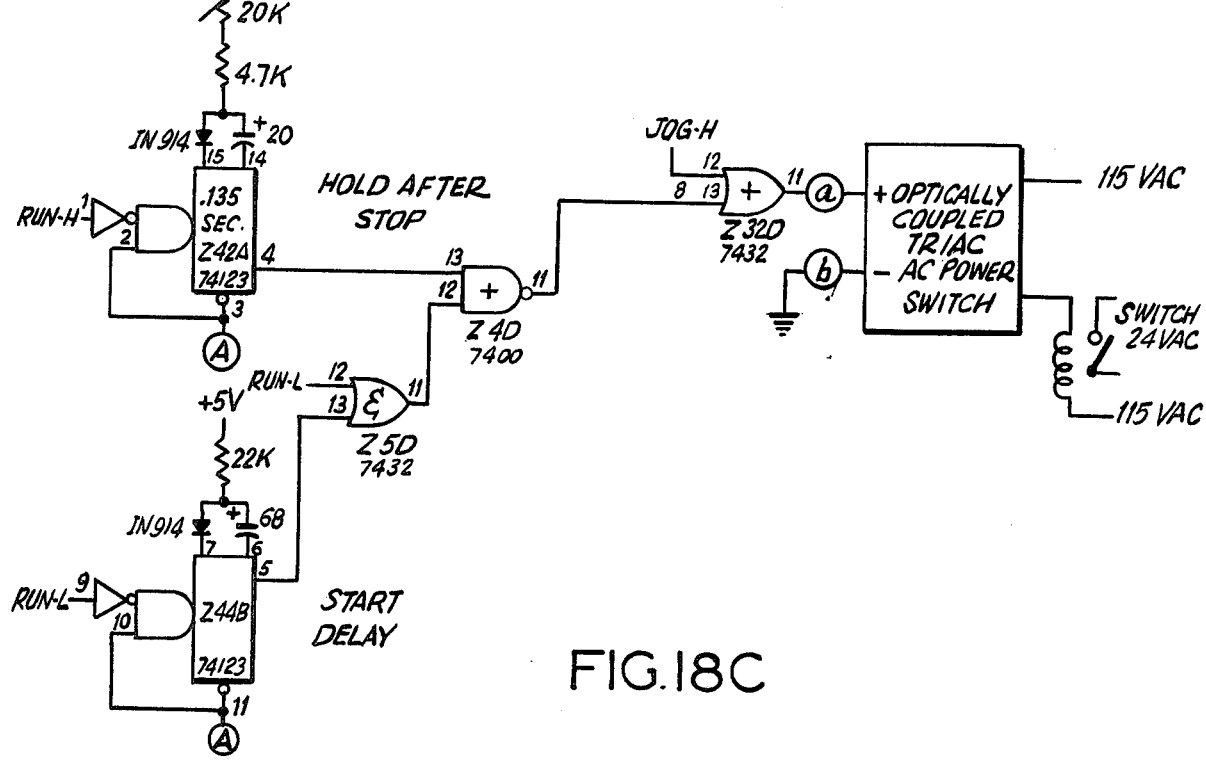

Referring to FIG. 18C, signal RUN-H inputs to one-shot circuit Z 42A, the output of which is one input to "or" gate Z 4D. A low transition of RUN-H occurs when stopping the machine to fire Z 42 immediately and hold for 0.135 seconds, as an example. This part of the circuit represents the "hold after stop". Signal RUN-L inputs to one-shot circuit Z 44B, the output of which is "anded" by Z 5D with the signal RUN-L, the output of Z 5D then forming the other input to "or" gate Z 4D. Z 44B fires on a low transition of signal RUN-L when starting the machine, and holds for a short period to disable Z 5D until the hold drops out. This part of the circuit represents the "start delay", and is used to delay dyeing the yarn until the yarn is in motion. The output of Z 4D is input to "or" gate Z 32D and is "ored" with the signal JOG-H. The output of Z 32D is input to an "optically coupled triac ac power switch", that switches the 24 volts to the solenoid valves via a 115 volt relay. Through the operation of FIG. 18C and the "optically coupled triac ac power switch", the solenoid valves controlling the yarn control assemblies will hold yarns on the dye pick-up rolls (for those particular yarn control assemblies that have been selected by pattern data) for only a short period after the stop switch is actuated, and will prevent the particular yarn control assemblies selected from being actuated for a short period of time after the start switch is actuated, to thereby prevent yarn ends being held on the dye pick-up rolls for too long a period because of the slower yarn speeds at starting or stopping. The period of time for one-shot circuits Z 42A and Z 44B to hold is adjustable and experimentally determined and set to avoid the described coloration difficulties.

When jogging, signal JOG-H from FIG. 18B inputs to "or" gate Z 32D of FIG. 18C to periodically pulse the solenoid power.

Shift Register Delay Boards

The embodiment of the present invention described herein utilizes five dye baths (30, 50, 70, 90, 110), 96 yarn control assemblies for each bath, and a total of 480 yarn control assemblies for the machine. Referring to FIG. 19A, 12 shift register delay boards are provided, each with 8 shift registers (SR-1 through SR-8 for the first board, SR-9 through SR-16 for the second board, and so forth through the twelfth board having registers SR-89 through SR-96). Shift registers SR-1 to SR-96 are connected in series, with shift register SR-1 connected serially to SR-2, shift register SR-2 connected serially to SR-3, and so forth. The last register on each board is connected serially to the first shift register on the next board (SR-8 to SR-9, SR-16 to SR-17, and so forth).

Referring next to FIG. 19B, shift registers SR-1 and SR-2 are shown in detail and represent every other shift register SR-3 through SR-96. Each register can hold up to 8 bits. The manner in which the shift registers are serially connected is shown by the "jumper" connected between registers SR-1 and SR-2, the "jumper" connected between SR-2 and SR-3, and so forth. Since the shift registers SR-1 to SR-96 can hold up to 8 bits, jumpers are connected out of each register (SR-1, for example) at the bit position leaving each register holding 6 bits in the embodiment of the invention herein described. There are five colors in this embodiment, but with six color digiswitches in FIG. 17 (allowing expansion of the system to six colors), the "Digiswitch Color 6" data is shifted into the previously described unused bit position of Z 16 (FIG. 17). This bit eventually is shifted into the sixth position (unused) of SR-1 through SR-96. Therefore, the switch setting of "Digiswitch Color 6" is not significant for the five color system here described.

Data is input to the series of shift registers SR-1 to SR-96 at the SRD DATA-L input to the left side of register SR-1. SRD DATA-L is the serial output of parallel to series shift register Z 16 in FIG. 17.

Signal SRCLK-H to each shift register SR-1 to SR-96 clocks each bit of data from the SRD DATA-L line into and down the serial chain of shift register SR-1 to SR-96. Signal SRCLK-H is derived in FIG. 19D from signal EXTSHFCLK-L (FIG. 16H) passed to inverting buffer 329. When the first Z 6 "byte" of data in a stitch is output on SRDDATA-L from Z 16, it is serially clocked through all shift registers down to SR-96. The next Z 7 "byte" of data output from Z 16 is clocked through the chain of shift registers to SR-95, each succeeding "byte" from Z 16 in a stitch being clocked to the next lower-ordered shift register, until all shift registers SR-1 to SR-96 contain a "byte" of pattern information. Each register will contain all zeros except for a 1 bit in a position in the register dependent upon the color it represents and accordingly the entry position of that 1 bit into register Z 16. At this point, a stitch of pattern data has been loaded into shift registers SR-1 to SR-96 for the embodiment of the invention herein described.

Referring to FIG. 19B, each shift register SR-1 to SR-96 has a latch line ($\phi$delay) and four varying delay lines connected to the first five bit positions of each register. The four delays are the "24" delay, the "72" delay, the "96" delay and the "144" delay.

When the SET $\phi$-H signal (FIG. 16C) occurs after a stitch of data is loaded into registers SR-1 to SR-96, the data bit in the $\phi$ delay position of SR-1 is latched into $\phi$ delay latch Z 300. Z 301 is a programmable shift register wired to give a 24 count delay, and is clocked by DELAY CLK-1 derived in FIG. 19C from DELAY CLK-H (FIG. 16G) and inverting buffers Z 326 from Z 327. DELAY CLK-2 is similarly derived in FIG. 19C from inverting buffers Z 326 and Z 328. Both DELAY CLK-1 and DELAY CLK-2 signals are derived to have a sufficient number of strong clock signals to clock the shift register delays being described. When Z 301 is clocked 24 times, a bit input from SR-1 at the 24 delay position is outputted on the 24 delay line. Z 302 is a programmable shift register wired to give a 64 count delay and is similarly clocked by DELAY CLK-1 64 times before a bit input from SR-1 at the 72 delay position is outputted through inverter Z 309 to Z 305, a shift register providing a further 8 count delay when clocked by DELAY CLK-2 before the bit is outputted on the 72 delay line. Similarly, Z 303 is a non-programmable shift register of 64 counts and Z 306 is a programmable shift register wired for 32 counts to provide an output on the 96 delay line, after 96 DELAY CLK-1 signals, of a bit input from SR-1 at the 96 delay position. Similarly Z 304 is a non-programmable shift register of 64 counts, Z 307 is a non-programmable shift register of 64 counts and Z 308 is a programmable shift register wired for 16 counts, to provide an output on the 144 delay line, after 144 DELAY CLK-1 signals, of a bit input from SR-1 at the 144 delay position. Z 310, Z 311 and Z 312 are inverters to provide sufficiently strong driving.

Shift register SR-2 and all other shift registers through SR-96 have the identical connecting circuitry and operation to the $\phi$ delay, 24 delay, 72 delay, 96 delay and 144 delay lines. SET $\phi$-H inputs to the $\phi$ delay latch of each shift register SR-1 to SR-96 in the same manner as described above, and DELAY CLK-1 and DELAY CLK-2 signals clock data through the delay lines of each register. For example, as to the SR-2 shift register, Z 313 is a $\phi$ delay latch (with input SET $\phi$-H); Z 314 is a 24 count shift register delay; Z 315 is a 64 count shift register delay and Z 318 is an 8 count shift register delay; Z 316 is a 64 count shift register delay and Z 319 is a 32 count shift register delay; and Z 317 is a 64 count shift register delay, Z 320 is a 64 count shift register delay, and Z 321 is a 16 count shift register delay. All these delays are clocked by DELAY CLK-1 or DELAY CLK-2 signals. Z 322, Z 323, Z 324 and Z 325 are inverters.

The $\phi$ delay line of each shift register SR-1 to SR-96 is connected through a solenoid driver to a separate solenoid controlling a separate one of the 96 yarn controlling assemblies associated with dye bath 30. The 24 delay line of each shift register SR-1 to SR-96 is connected through a solenoid driver to a separate solenoid controlling a separate one of the 96 yarn controlling assemblies associated with dye bath 50. Similarly, the 72 delay line of each shift register SR-1 to SR-96 controls a separate one of the 96 yarn control assemblies associated with dye bath 70; the 96 delay line of each shift register SR-1 to SR-96 controls a separate one of the 96 yarn control assemblies associated with dye bath 90; and the 144 delay line of each shift register SR-1 to SR-96 controls a separate one of the 96 yarn control assemblies associated with dye bath 110.

Further, each individual shift register SR-1 to SR-96 controls yarn control assemblies manipulating an individual yarn end(s). For example, shift register SR-1 controls the five yarn control assemblies at dye baths 30, 50, 70, 90, 110 that control the same yarn end(s). Similarly, shift register SR-2 controls the five yarn control assemblies at dye baths 30, 50, 70, 90, 110 that control a different individual yarn end(s), and so forth. The first pattern point of data of each stitch goes to SR-96, the second pattern point of data for each stitch goes to SR-95, the third pattern point of data of each stitch goes to SR-94, and so forth. Accordingly, referring to FIG. 2, the 0, 24, 72, 96 and 144 delay lines of SR-96 pass to solenoid valves $V_1(R)$ above each dye bath; the same delay lines of SR-95 pass to solenoid valves $V_2(R)$ above each dye bath; the same delay lines of SR-94 pass to solenoid valves $V_3(R)$ above each dye bath; and so forth, with the same delay lines of SR-48, for example, passing to solenoid valves $V_1'(L)$ above each dye bath, etc.

It will be appreciated that on implementing each particular stitch of pattern information, a control signal will be on only one of the selected delay lines from each shift register SR-1 to SR-96, and will represent one particular color. The 0, 24, 72, 96 and 144 count delays for each shift register SR-1 to SR-96 are, as previously described, solely a function of the physical displacement of the dye baths 30, 50, 70, 90 and 110, the displacement being arbitrary (but on a one to two to one to two ratio in the embodiment described herein, the delays accordingly being on the same ratio). The delays must be proportioned to the physical displacements of the dye baths, since the yarn clocks, generated by yarn net displacement, shift the color signals through the shift register delays. Yarn clocks occur each ½ inch of yarn net displacement, and in the embodiment of the present invention here described, the dye bath spacing is 12 inches (dye baths 30-50), 36 inches (dye baths 30-70), 48 inches (dye baths 30-90) and 72 inches (dye baths 30-110). Referring to FIG. 3, the $\phi$ delay line of each shift register SR-1 to SR-96 corresponds to latch 206; the 24 delay line of each shift register SR-1 to SR-96 corresponds to delay 209; the 72 delay line of each shift register SR-1 to SR-96 corresponds to delay 212; the 96 delay line of each shift register SR-1 to SR-96 corresponds to delay 215; and the 144 delay line of each shift register SR-1 to SR-96 corresponds to delay 218.

After each stitch of pattern data in shift registers SR-1 to SR-96 has been clocked out of the shift registers SR-1 to SR-96 to the respective latch and delay lines, a new stitch is input from EPROM pattern card 201 under control of the backing net displacement clock (3/16 of an inch net backing displacement). Each succeeding stitch is clocked into and out of the shift registers SR-1 to SR-96 in the above described manner until the entire color pattern has been dyed and tufted.

Figure 19E:
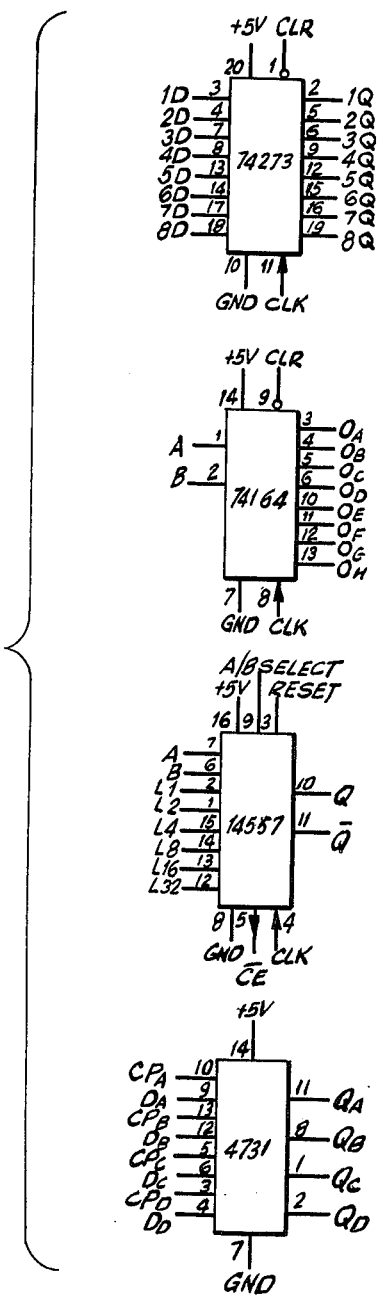

FIG. 19E illustrates the pin connections for the integrated circuit chips used in the latch and delay lines connected to shift registers SR-1 to SR-96.

Solenoid Devices

FIG. 20 illustrates circuitry whereby signals from each 0, 24, 72, 96 and 144 delay line of each shift register are input to a separate such circuit of FIG. 20 at the left side. The amplifier shown drives the triac gate to operate the solenoid valve associated with a particular yarn control assembly when a signal is on the left side circuit input.

The above-described embodiment is merely illustrative of the principles of the present invention. Many modifications within the scope of the invention will be apparent to those skilled in the art, and the invention is not limited to the specific form illustrated and described. The invention is also applicable to other textile fabricating operations.

What is claimed is:

1. Apparatus for dyeing, individually, yarn ends of a plurality of yarn ends at predetermined positions along their lengths and producing a tufted textile product with a multi-colored predetermined complex design incorporated therein, comprising: a tufting station; a plurality of spaced dyeing stations of different colors; a plurality of yarn control assemblies at each dyeing station, each yarn control assembly controlling one or more individual yarn ends and having a corresponding yarn control assembly at each other dyeing station controlling the same one or more individual yarn ends as the yarns are passed through the dyeing stations; each yarn control assembly being individually controllable by digital color pattern data to cause the dyeing of yarn at its associated dyeing station; a holding register for holding digital color pattern data for each yarn control assembly at a first dyeing station, and for the corresponding yarn control assembly at each other dyeing station; means to present a stitch of sequential digital color pattern data from a predetermined pattern to the holding registers for yarn control assemblies sequentially positioned from one side of a dyeing station to the other side, each holding register then containing digital color pattern data identifying one particular dyeing station having a particular color dye; means to output digital color pattern data from each holding register to the yarn control assemblies at the first dyeing station when predetermined portions of yarn ends are at the first dyeing station, and means to delay the output of digital color pattern data from each holding register to the yarn control assemblies at each other dyeing station until the same predetermined portions of yarn ends are at the other dyeing stations, whereby the stitch of digital color pattern data in the holding registers causes particular yarn control assemblies at particular dyeing stations receiving digital color pattern data to dye the yarn ends they control; and means for presenting each next sequential stitch of digital color pattern data from a predetermined pattern to the holding registers for a corresponding operation; whereby, individual yarn ends are dyed different colors at predetermined positions along their length and a multi-colored predetermined complex design is tufted according to the digital color pattern data presented to the holding registers.

2. The invention of claim 1, wherein a backing is applied to the tufted textile product at the tufting station and means are provided responsive to the linear displacement of the backing to present each succeeding stitch of digital color pattern data to the holding registers.

3. The invention of claim 1, including means responsive to the linear displacement of the yarn ends to provide the delay of output of digital color pattern data from each holding register to the yarn control assemblies of each other dye station until the same predetermined portions of yarn ends are at the other dye stations.

4. The invention of claim 3, including shift register delay means clocked by signals generated by said means responsive to the linear displacement of the yarn ends.

5. The invention of claim 1, wherein the holding registers are connected in series and are loaded serially with each stitch of digital color pattern data for parallel output.

6. The invention of claim 2, including means to sense forward and reverse linear displacement of the carpet backing, and to generate a digital signal upon a given net forward linear displacement of the carpet backing.

7. The invention of claim 3, including means for sense forward and reverse linear displacement of the yarn ends, and to generate a digital signal upon a given net forward linear displacement of the yarn ends.

8. The invention of claim 2, including logic means to eliminate vibrational effects upon electrical signals from the means responsive to linear displacement of the carpet backing.

9. The invention of claim 3, including logic means to eliminate vibrational effects upon electrical signals from the means responsive to linear displacement of the yarn ends.

10. The invention defined in claim 1, including means to interchange the dye colors of a predetermined pattern being dyed and tufted.

11. The invention defined in claim 1, including means to delay dyeing of yarns upon starting the yarns in motion until after the yarn ends are in motion.

12. The invention defined in claim 1, including means to cease dyeing of yarns when the yarn ends drop from their normal operating speed and before yarn motion ceases.

13. The invention defined in claim 1, wherein the stitches of digital color pattern data are sequentially stored in programmable read only memory and means are provided for locating and outputting each sequential stitch of said digital color pattern data from the said memory to the holding registers.

14. The invention defined in claim 10, said means including color selection digiswitches.

15. The invention defined in claim 13, wherein each stitch in the said memory is in binary format and is decoded to decimal format before being presented to the holding registers.

16. The invention of claim 6, wherein said means to sense forward and reverse linear displacement of the carpet backing includes a two phase clock generator.

17. The invention of claim 7, wherein said means to sense forward and reverse linear displacement of the yarn ends includes a two phase clock generator.

18. The invention of claim 15, further including a binary to decimal decoder for decoding each discrete binary color pattern piece of information within a stitch to a decimal color pattern piece of information; a plurality of color digiswitches each uniquely settable to one of the plurality of different colors to be dyed, said plurality of color digiswitches being connected to the output of said decoder; and a parallel to serial shift register whose input positions are uniquely connected to said plurality of color digiswitches; whereby, each decimal piece of information is output by only one of said color digiswitches to an input position in said shift register representative of a particular color of the plurality of different colors to be dyed.

19. The invention of claim 18, wherein said parallel to serial shift register outputs each input piece of information to said holding registers.

20. The invention of claim 1, including means to intermittently dye the yarns when the yarn ends are being jogged through intermittent starting and stopping of the machine.

* * * * *

UNITED STATES PATENT AND TRADEMARK OFFICE
CERTIFICATE OF CORRECTION

PATENT NO. : 4,106,416
DATED : August 15, 1978
INVENTOR(S) : James Otto Blackstone, Jr.; Fred Pickett Strother It is certified that error appears in the above-identified patent and that said Letters Patent are hereby corrected as shown below:

Col. 2, line 64, "clock-" should be --Clock- --.

Col. 5, line 7, "20" should be --2--.

Col. 5, line 42, "70" (second occurrence) should be --90--.

Col. 6, line 15, "$V_{40}'$" should be --$V_{48}'$--.

Col. 14, line 52, " 'added' " should be --"anded"--.

Col. 16, line 67, "and" should be --are--.

Col. 19, line 66, "the" should be --and--.

Col. 22, line 10, "from" should be --and--.

Col. 24, line 66, "of" should be --at--.

Signed and Sealed this

Twentieth Day of March 1979

[SEAL]

Attest:

RUTH C. MASON
Attesting Officer

DONALD W. BANNER
Commissioner of Patents and Trademarks